United States Patent
Xia et al.

(10) Patent No.: US 7,872,069 B2
(45) Date of Patent: Jan. 18, 2011

(54) COATED SUBSTRATES AND POLYMER DISPERSIONS SUITABLE FOR USE IN MAKING THE SAME

(75) Inventors: Jusong Xia, Gastonia, NC (US); Zhaolin Zhou, Singapore (SG); Kirkland W. Vogt, Simpsonville, SC (US); Philip G. Harris, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 809 days.

(21) Appl. No.: 11/689,017

(22) Filed: Mar. 21, 2007

(65) Prior Publication Data
US 2008/0261052 A1 Oct. 23, 2008

Related U.S. Application Data

(63) Continuation-in-part of application No. 11/395,665, filed on Mar. 31, 2006, now Pat. No. 7,662,461, and a continuation-in-part of application No. 11/558,700, filed on Nov. 10, 2006, now abandoned.

(51) Int. Cl.
*C08G 18/08* (2006.01)
(52) U.S. Cl. .................. 524/591; 524/800; 524/801; 524/846; 428/423.1; 428/423.4
(58) Field of Classification Search .............. 524/591, 524/800–801, 846
See application file for complete search history.

(56) References Cited

U.S. PATENT DOCUMENTS

| | | | |
|---|---|---|---|
| 3,157,663 A | 11/1964 | Bencze | |
| 3,496,001 A | 2/1970 | Minobe et al. | |
| 3,841,897 A | 10/1974 | Okazaki et al. | |
| 3,879,336 A | 4/1975 | Maeda et al. | |
| 3,880,797 A | 4/1975 | Maeda et al. | |
| 3,959,049 A | 5/1976 | Tanaka et al. | |
| 3,970,601 A | 7/1976 | Weber et al. | |
| 4,026,931 A | 5/1977 | Wiesel et al. | |
| RE29,711 E | 7/1978 | Wood | |
| 4,190,572 A | 2/1980 | Nishimura et al. | |
| 4,284,729 A | 8/1981 | Cross et al. | |
| 4,349,597 A | 9/1982 | Fine et al. | |
| 4,412,022 A | 10/1983 | Hirai et al. | |
| 4,620,852 A | 11/1986 | Nishikawa et al. | |
| 4,640,690 A | 2/1987 | Baumgartner et al. | |
| 4,812,141 A | 3/1989 | Baumgartner et al. | |
| 4,822,685 A | 4/1989 | Perez et al. | |
| 5,017,667 A | 5/1991 | Cawse et al. | |
| 5,125,930 A | 6/1992 | Taniguchi | |
| 5,236,995 A | 8/1993 | Salatin et al. | |
| 5,637,637 A | 6/1997 | Sharma et al. | |
| 5,700,851 A | 12/1997 | Banning et al. | |
| 5,731,385 A | 3/1998 | Knors et al. | |
| 5,731,398 A | 3/1998 | Ragsdale et al. | |
| 5,733,714 A | 3/1998 | McCulloch et al. | |
| 5,782,966 A | 7/1998 | Bui et al. | |
| 5,919,846 A | 7/1999 | Batlaw et al. | |
| 5,948,152 A | 9/1999 | Zhao et al. | |
| 5,948,153 A | 9/1999 | Ann et al. | |
| 6,274,203 B1 | 8/2001 | Kawaguchi et al. | |
| 6,411,029 B1 | 6/2002 | Czak | |
| 6,455,611 B1 | 9/2002 | Pears et al. | |
| 6,503,309 B2 | 1/2003 | Batlaw et al. | |
| 6,607,588 B2 | 8/2003 | Batlaw | |
| 6,800,358 B2 | 10/2004 | Batlaw et al. | |
| 6,864,395 B2 | 3/2005 | Lassila et al. | |
| 7,001,952 B2 | 2/2006 | Faler et al. | |
| 2003/0211334 A1 | 11/2003 | Jones | |
| 2003/0220446 A1 | 11/2003 | Faler et al. | |
| 2004/0063889 A1 | 4/2004 | Kaul et al. | |
| 2004/0127639 A1 | 7/2004 | Wang et al. | |
| 2005/0266192 A1 | 12/2005 | Yoneda et al. | |
| 2005/0277765 A1 | 12/2005 | Madaras et al. | |
| 2006/0089422 A1 | 4/2006 | Vasudevan | |
| 2006/0141228 A1 | 6/2006 | Rearick et al. | |

FOREIGN PATENT DOCUMENTS

| | | |
|---|---|---|
| EP | 0 584 565 A1 | 7/1993 |
| EP | 0 318 294 B1 | 12/1994 |
| EP | 0 690 084 A1 | 1/1996 |
| EP | 0 837 082 A1 | 4/1998 |
| EP | 0 808 855 B1 | 7/2002 |

(Continued)

OTHER PUBLICATIONS

Bajorek, A. et al. *Macromolecules* 1998, 31, 86-95.

(Continued)

*Primary Examiner*—Lynda Salvatore
(74) *Attorney, Agent, or Firm*—Robert M. Lanning

(57) ABSTRACT

A coated substrate comprises a substrate and a coating on at least one surface of the substrate. The coating comprises a prepolymer, polymer, or resin produced, for example, by the reaction of (i) an isocyanate (e.g., a polyisocyanate), (ii) an active hydrogen-terminated colorant, and optionally (iii) at least one reactant selected from the group consisting of chain extenders, polyols, internal surfactants, and combinations thereof. Polymer dispersions suitable for use in making such coated substrates comprise such a prepolymer, polymer, or resin.

11 Claims, No Drawings

FOREIGN PATENT DOCUMENTS

| | | |
|---|---|---|
| GB | 1 420 258 | 1/1976 |
| JP | 11-148034 A | 8/1998 |
| WO | WO 99/40123 A3 | 8/1999 |
| WO | WO 99/50326 | 10/1999 |
| WO | WO 02/50197 A1 | 6/2002 |
| WO | WO 02/066483 A1 | 8/2002 |
| WO | WO 02/066563 A1 | 8/2002 |
| WO | WO 2005/019523 A3 | 3/2005 |

OTHER PUBLICATIONS

Haas, H. C. et al. *J Polym Sci Pol Chem* 1973, 11, 327-343.
Kim, B. K. *Colloid Polym Sci* 1996, 274, 599-611.
Laplume, P. J. et al. *Leather Facts* ($3^{rd}$ Ed.), New England Tanners Club (1994).
Miley, J. *Pure Appl Chem* 1996, 68, 1423-1428.
Miller, R. D. et al. *Tetrahedron Lett* 1995, 36, 4393-4396.
Oertel, G., *Polyurethane Handbook* ($2^{nd}$ Ed.), Hansen Publishers, pp. 575-594 (1994).
Randall, D. et al. *The Polyurethanes Book*, John Wiley & Sons, pp. 336-337 (2002).

COATED SUBSTRATES AND POLYMER DISPERSIONS SUITABLE FOR USE IN MAKING THE SAME

CROSS-REFERENCE TO RELATED PATENT APPLICATIONS

This application is a continuation-in-part of U.S. patent application Ser. No. 11/395,665, now U.S. Pat. No. 7,662,461 filed on Mar. 31, 2006, and U.S. patent application Ser. No. 11/558,700, now abandoned filed on Nov. 10, 2006.

FIELD OF THE INVENTION

The present invention is directed to substrates comprising a coating on the surface thereof, such as substrates having a coating thereon intended to mimic the look and feel of leather. Such substrates include, but are not limited to, natural leather substrates and textile materials.

BACKGROUND OF THE INVENTION

Synthetic leather typically is produced by coating or laminating an elastic polymer resin, such as a polyurethane resin, a polyvinyl chloride resin, or a blend of such resins, onto the surface of a fibrous base material. In order to produce a synthetic leather in a variety of colors and/or shades, various pigments or dyes have been used to color the resin applied to the surface of the base material. However, the use of such pigments and dyes has not been without its disadvantages and drawbacks.

For example, pigments usually have low tinting strength and a dull shade, which can limit the aesthetic qualities of synthetic leather produced using them. Pigments typically lack solubilizing groups, which frequently allows the pigment particles to aggregate and form larger secondary and tertiary aggregate particles during production processes. Owing to these difficulties, synthetic leathers colored with conventional pigments often exhibit poor color retention, have a dark or dull shade, or contain unsuitable variations in color depth. While these problems can be partially addressed through the addition of dispersing agents or by utilizing pigment dispersions, these measures often result in increased production costs and still require great care to minimize color variations produced by settling of the pigment(s) and/or incompatibility of these components with the resin.

Dyes, on the other hand, typically contain solubilizing groups that can facilitate dispersion of the dye in a suitable medium. Dyes also typically exhibit relatively high tinting strength, good transparency, good thermal stability, and acceptable resin compatibility. Nevertheless, dyes typically exhibit poor weather durability, poor water resistance, poor oil resistance, and often migrate or bleed through to the transfer substrates, such as a release paper used to produce the synthetic leather and to other substrates that the dyes may contact, such as a polyvinyl chloride (PVC) substrate. In order to address the migration of dyes to the transfer substrate, attempts have been made to utilize nylon or polyurethane overcoats applied to the transfer substrate. However, satisfactory topcoats have not been developed without incurring significantly higher cost.

A need therefore remains for novel colored leather articles that address the deficiencies of articles produced with conventional pigments and dyes, while still exhibiting the desired aesthetic qualities. The present invention provides such articles and methods for producing the same.

BRIEF SUMMARY OF THE INVENTION

In one embodiment, a leather article comprises a substrate and a coating on at least one surface of the substrate. The coating comprises a resin and a polymeric colorant. The polymeric colorant comprises a chromophore and an oligomeric constituent bound to the chromophore.

In another embodiment, a leather article comprises a substrate and a coating on at least one surface of the substrate. The coating comprises a prepolymer or resin. The prepolymer or resin can be produced, for example, by the reaction of (i) an isocyanate, (ii) at least one reactant selected from the group consisting of chain extenders, polyols, and combinations thereof, and (iii) an active hydrogen-terminated colorant. The active hydrogen-terminated colorant comprises a chromophore and at least one active hydrogen-terminated constituent bound to the chromophore.

In another embodiment, a coated substrate comprises a substrate and a coating on at least one surface of the substrate. The coating comprises a prepolymer, polymer, or resin. The prepolymer, polymer, or resin can be produced, for example, by the reaction of (i) an isocyanate (e.g., a polyisocyanate), (ii) an active hydrogen-terminated colorant, and optionally (iii) at least one reactant selected from the group consisting of chain extenders, polyols, and combinations thereof. The active hydrogen-terminated colorant comprises a chromophore and at least one active hydrogen-terminated constituent bound to the chromophore. In certain embodiments, the active hydrogen-terminated colorant can be a polymeric colorant comprising a chromophore and an oligomeric constituent bound to the chromophore. The reactant mixture used to produce the prepolymer, polymer, or resin can further comprise an internal surfactant.

In a first embodiment, a method for producing a synthetic leather articles comprises the steps of (a) providing a resin or prepolymer, (b) providing a polymeric colorant, (c) mixing the polymer colorant and the resin or prepolymer to form a mixture, (d) applying the mixture obtained in step (c) onto a transfer substrate and heating the substrate to dry the substrate and form a resin coating thereon, (e) applying an adhesive onto the resin coating produced in step (d), (f) applying a backing substrate to the adhesive layer produced in step (e), (g) heating the assembly produced in step (f) to dry the assembly and bond the fibrous backing substrate to the adhesive layer, and (h) removing the transfer substrate from the assembly produced in (g) to produce a synthetic leather article.

In a second embodiment, a method for producing a synthetic leather articles comprises the steps of (a) providing a resin or prepolymer, (b) providing a polymeric colorant, (c) mixing the polymer colorant and the resin or prepolymer to form a mixture, (d) applying the mixture obtained in step (c) onto a backing substrate, (e) immersing the coated substrate obtained in step (d) in an aqueous solution to cure the resin or prepolymer and form a coating on the surface thereof, (f) removing the substrate from the aqueous solution, and (g) heating the substrate to dry the substrate and produce a synthetic leather article.

In another embodiment, a method for producing a leather article comprises the steps of (a) providing a prepolymer or resin produced by the reaction of (i) an isocyanate, (ii) at least one reactant selected from the group consisting of chain extenders, polyols, and combinations thereof, and (iii) an active hydrogen-terminated colorant, (b) applying the prepolymer or resin onto a transfer substrate to form a film coating of the prepolymer, (c) applying a backing substrate onto the film coating of the prepolymer or resin produced in step (b), (d) heating the assembled backing substrate, film coating, and transfer substrate to bond the backing substrate to the film coating of the prepolymer or resin, and (e) removing the transfer substrate to yield a leather article comprising the backing substrate and a coating on a surface thereof. The coating comprises a prepolymer or resin produced by the reaction of (i) the isocyanate, (ii) at least one reactant selected from the group consisting of chain extenders, polyols, and combinations thereof, and (iii) the active hydrogen-terminated colorant. The active hydrogen-terminated colorant is selected from the group of colorants conforming to structure (I)

In structure (I), $R_1$ or $R_1$-$[E]_m$ is an organic chromophore, E is a linking moiety selected from the group consisting of nitrogen, oxygen, sulfur, a sulfite group, a sulfonamide group, and a carboxyl group, and n and m are independently selected from the group consisting of integers between 1 and 5. Each Z is a divalent organic moiety independently selected from the group consisting of $C_1$-$C_{20}$ alkyl moieties, aryl moieties, and alkoxyl moieties. Each X is an end group independently selected from the group consisting of hydrogen, a hydroxyl group, a sulfhydryl group, thiol groups, amine groups, alkyl groups, aryl groups, alkyl ester groups, aryl ester groups, organic sulfonate groups, organic sulfate groups, and amide groups. At least one —Z—X constituent terminates in an group selected from the group consisting of a hydroxyl group, thiol groups, primary amine groups, secondary amine groups, primary amide groups, and secondary amide groups.

In another embodiment, a method for producing a leather article comprises the steps of (a) providing a prepolymer or resin produced by the reaction of (i) an isocyanate, (ii) at least one reactant selected from the group consisting of chain extenders, polyols, and combinations thereof, and (iii) an active hydrogen-terminated colorant, (b) providing a backing substrate, (c) applying the prepolymer or resin onto a surface of the backing substrate, (d) heating the coated backing substrate produced in step (c) to produce a coating on the surface of the backing substrate, thereby yielding a leather article comprising the backing substrate and a coating on a surface thereof. The coating comprising a prepolymer or resin produced by the reaction of (i) the isocyanate, (ii) the at least one reactant selected from the group consisting of chain extenders, polyols, and combinations thereof, and (iii) the active hydrogen-terminated colorant. The active hydrogen-terminated is selected from the group of colorants conforming to structure (I)

In structure (I), $R_1$ or $R_1$-$[E]_m$ is an organic chromophore, E is a linking moiety selected from the group consisting of nitrogen, oxygen, sulfur, a sulfite group, a sulfonamide group, and a carboxyl group, and n and m are independently selected from the group consisting of integers between 1 and 5. Each Z is a divalent organic moiety independently selected from the group consisting of $C_1$-$C_{20}$ alkyl moieties, aryl moieties, and alkoxyl moieties. Each X is an end group independently selected from the group consisting of hydrogen, a hydroxyl group, a sulfhydryl group, thiol groups, amine groups, alkyl groups, aryl groups, alkyl ester groups, aryl ester groups, organic sulfonate groups, organic sulfate groups, and amide groups. At least one —Z—X constituent terminates in an group selected from the group consisting of a hydroxyl group, thiol groups, primary amine groups, secondary amine groups, primary amide groups, and secondary amide groups.

In another embodiment, a method for producing a coated substrate comprises the steps of (a) providing a prepolymer, polymer, or resin produced by the reaction of (i) an isocyanate, (ii) an active hydrogen-terminated colorant, and optionally (iii) at least one reactant selected from the group consisting of chain extenders, polyols, and combinations thereof, (b) providing a backing substrate, and (c) applying the prepolymer or resin onto a surface of the backing substrate, thereby producing a coating on at least one surface of the substrate. The coating comprises a prepolymer, polymer, or resin produced by the reaction of (i) the isocyanate, (ii) the active hydrogen-terminated colorant, and optionally (iii) the at least one reactant selected from the group consisting of chain extenders, polyols, and combinations thereof. The active hydrogen-terminated is selected from the group of colorants conforming to structure (I)

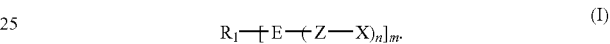

In structure (I), $R_1$ or $R_1$-$[E]_m$ is an organic chromophore, E is a linking moiety selected from the group consisting of nitrogen, oxygen, sulfur, a sulfite group, a sulfonamide group, and a carboxyl group, and n and m are independently selected from the group consisting of integers between 1 and 5. Each Z is a divalent organic moiety independently selected from the group consisting of $C_1$-$C_{20}$ alkyl moieties, aryl moieties, and alkoxyl moieties. Each X is an end group independently selected from the group consisting of hydrogen, a hydroxyl group, a sulfhydryl group, thiol groups, amine groups, alkyl groups, aryl groups, alkyl ester groups, aryl ester groups, organic sulfonate groups, organic sulfate groups, and amide groups. At least one —Z—X constituent terminates in an group selected from the group consisting of a hydroxyl group, thiol groups, primary amine groups, secondary amine groups, primary amide groups, and secondary amide groups. The reactant mixture used to produce the prepolymer, polymer, or resin can further comprise an internal surfactant.

The invention also provides dispersions of polymers suitable for use in making coated substrates. In a first embodiment, a dispersion comprises (a) an aqueous continuous phase, and (b) a discontinuous phase comprising a polyurethane polymer or polyurethane polymer segment. The polymer or polymer segment can be the product of the reaction of a reactant mixture comprising (i) a polyisocyanate, (ii) an internal surfactant, and (iii) an active hydrogen-terminated colorant. The resulting polymer can then be dispersed in water and, if desired, reacted with a suitable chain extender to increase the molecular weight of the polymer.

In a second embodiment, a dispersion comprises (a) an aqueous continuous phase and (b) a discontinuous phase comprising a polyurethane polymer or polyurethane polymer segment. The polymer or polymer segment can be produced by a process comprising the steps of (i) reacting a polyisocyanate with an active hydrogen-terminated colorant to produce a polymer intermediate and (ii) reacting the polymer intermediate produced in step (i) with an internal surfactant to produce the polyurethane polymer or polyurethane polymer segment. The resulting polymer can then be dispersed in water and, if desired, reacted with a suitable chain extender to increase the molecular weight of the polymer.

DETAILED DESCRIPTION OF THE INVENTION

A coated substrate comprises a substrate and a coating on at least one surface of the substrate. The coating comprises a prepolymer, polymer, or resin. In certain embodiments of the coated substrate, a synthetic leather article comprises a substrate and a coating on at least one surface of the substrate. The coating comprises a resin and a polymeric colorant. The polymeric colorant can be dispersed within the resin or the polymeric colorant and the resin can be copolymerized to produce a colored resin.

The substrate can be any suitable substrate, such as a fibrous substrate, a natural leather substrate, thermoplastic resins, thermoset resins, and combinations thereof. In certain possibly preferred embodiments, the substrate is a textile material. Suitable textiles include, but are not limited to, woven textiles, knit textiles, and non-wovens. The textiles can be made from any suitable natural fibers, synthetic fibers, or combinations thereof.

In order to promote adhesion between the substrate and the coating, the substrate can comprise a precoat layer on the surface to which the coating is applied. The precoat layer can comprise any suitable material, such as a material that promotes adhesion between the substrate and the coating. For example, the precoat layer can comprise elastomeric polymers.

The coating can comprise any suitable portion of the coated substrate. In certain possibly preferred embodiments, the coating can be substantially coextensive or coextensive with at least one surface of the substrate. As utilized herein, the term "substantially coextensive" means that the coating covers about 50% or more, preferably about 75% or more, more preferably about 90% or more, and most preferably about 95% or more of the area of the substrate surface on which the coating is disposed. The amount of the coating can also be expressed in terms of its contribution to the total weight of the coated substrate. In certain possibly preferred embodiments, the coating comprises about 0.1% or more, about 0.5% or more, or about 1% or more of the total weight of the coated substrate.

The prepolymer, polymer, or resin in the coating can be any suitable prepolymer, polymer, or resin. The prepolymer, polymer, or resin typically will be selected to provide an article that is flexible and durable, while providing the properties necessary or desirable for mimicking, for example, real leather. In certain possibly preferred embodiments, the prepolymer, polymer, or resin is selected from the group consisting of polyurethane resins, polyurea resins, and combinations thereof. Suitable polyurethanes include linear polyurethanes as well as cross-linked polyurethanes, such as a polyurethane cross-linked with hexamethylene diisocyanate trimer.

In certain embodiments, the prepolymer, polymer, or resin can be, for example, the product of the reaction of a reactant mixture comprising (i) an isocyanate (e.g., a polyisocyanate) and (ii) an active hydrogen-terminated colorant. In certain embodiments, the reactant mixture can further comprise at least one reactant selected from the group consisting of chain extenders, polyols, and combinations thereof. The reactant mixture can, in certain embodiments, further comprise an internal surfactant.

The prepolymer, polymer, or resin used in the coating can be produced by any suitable method. As noted above, the prepolymer, polymer, or resin can be produced via the reaction of an isocyanate (e.g., a polyisocyanate) and an active hydrogen-terminated colorant, as well as one or more of an internal surfactant, polyol, and chain extender, if desired. The compounds present in the reactant mixture can be reacted under any suitable conditions, such as those conditions known in the art to produce polyurethane polymers or prepolymers through the reaction of the isocyanate groups with the active hydrogen groups present on the colorant, internal surfactant (if present), polyol (if present), and chain extender (if present). For example, in certain embodiments in which an internal surfactant is employed, the isocyanate, active hydrogen-terminated colorant, and internal surfactant can all be combined together in suitable reaction medium and reacted under the appropriate conditions to produce a polyurethane polymer or prepolymer. In such a process, the resulting polyurethane polymer or prepolymer will most likely be comprised of a random sequence of monomers resulting from the reaction of the isocyanate with the active hydrogen-terminated colorant and the reaction of the isocyanate with the internal surfactant. As will be understood by those of skill in the art, the sequence of these monomers in the polymeric chain of the polyurethane polymer or prepolymer will be a random arrangement due to the fact that all of the reactants are present in the reactant mixture at the same time and the reactions necessary to produce each monomer are equally likely (or at least nearly as likely) to occur. Thus, the resulting polymer or prepolymer will likely contain a random arrangement of these monomers resulting from the random reactions taking place within the reactant mixture. In certain possibly preferred embodiments, it may be beneficial to produce a polymer or prepolymer comprising distinct segments or blocks produced by the reaction of several molecules of the isocyanate and the active hydrogen-terminated colorant and distinct segments or blocks produced by the reaction of several molecules of the isocyanate and the internal surfactant. Such a polymer or prepolymer can be produced, for example, by first reacting the isocyanate and the active hydrogen-terminated colorant to produce a polymer intermediate, and then reacting the polymer intermediate with the internal surfactant to produce the desired polyurethane polymer or prepolymer. Alternatively, the isocyanate and the internal surfactant can be reacted first, and the resulting polymer intermediate can then be reacted with the active hydrogen-terminated colorant. Because the reactants are added sequentially in the processes described above, the resulting polymer or prepolymer will contain blocks or segments of monomers resulting from each of the successive reactions.

The prepolymers, polymers, or resins suitable for use in the coating can be produced using any suitable polyol. Suitable polyols include, but are not limited to, glycols of low molecular weight, such as ethylene glycol, 1,2-propylene glycol, 1,3-propylene glycol, 1,4-butylene glycol, and 1,6-hexamethylene glycol; polyester diols obtained from dibasic acids, such as adipic acid, maleic acid, and terephthalic acid; polyester diols, such as polylactones obtained by subjecting lactones to ring-opening polymerization with glycols; polycarbonate diols; and polyether diols, such as polytetramethylene glycol, polyethylene glycol, and polypropylene glycol.

The prepolymers, polymers, or resins suitable for use in the coating can be produced using any suitable isocyanate. Suitable isocyanates include, but are not limited to, aromatic diisocyanates, such as toluene-2,4-diisocyanate (TDI), a mixture of toluene-2,4-diisocyanate and toluene-2,6-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenyl-isocyanate) (MDI), 2,4'-methylenebis(phenyl-isocyanate), a mixture of 4,4'-methylenebis(phenyl-isocyanate) and 2,4'-methylenebis(phenyl-isocyanate), polymeric MDI, durylene diisocyanate, tolidine diisocyanate, xylylene diisocyanate (XDI), 1,5-naphthalene diisocyanate, benzidine diisocyanate, o-nitrobenzidine diisocyanate, and 4,4-diisocyanatodibenzyl; aliphatic diisocyanates, such as methylene diisocyanate, 1,4-tetramethylene diisocyanate, 1,6-hexamethylene diisocyanate, and 1,10-decamethylene diisocyanate; alicyclic diisocyanates, such as 1,4-cyclohexylene diisocyanate, 4,4'-methylene-bis(cyclohexylisocyanate), 1,5-tetrahydronaphthalene diisocyanate, meta-tetramethylxylylene diisocyanate, isophorone diisocyanate, hydrogenated MDI, and hydrogenated XDI; and polyurethane prepolymers obtained by reacting any of the aforementioned diisocyanates with polyols or polyamines of low molecular weights such that the resulting prepolymers have isocyanate groups at ends thereof. Among the aforementioned, aromatic diisocyanates, particularly diphenylmethane-4,4'-diisocynate (4,4'-MDI) or polymeric MDI, are preferred for obtaining articles exhibiting good physical characteristics such as thermal stability, solution stability, and fracture strength. Alicyclic diisocyanates, such as isophorones, are preferred for obtaining polyurethanes that exhibit anti-yellowing properties and are not easily discolored upon exposure to sunlight.

As noted above, the prepolymers, polymers, or resins suitable for use in the coating can be produced using suitable chain extenders. These include, but are not limited to, water; low-molecular diols, such as ethylene glycol and propylene glycol; aliphatic diamines, such as ethylenediamine; aromatic diamines, such as 4,4'-diaminodiphenylmethane; alicyclic diamines, such as 4,4'-diaminodicyclohexylmethane and isophoronediamine; alkanolamines, such as ethanolamine; hydrazines; and dihydrazides, such as succinic dihydrazide. Among the aforementioned chain extenders, the diamine compounds are preferable, with 4,4'-diaminodiphenylmethane being particularly preferred due to its heat resistance and 4,4'-diaminodicyclohexylmethane being preferred for light resistance. The aforementioned chain extenders can, of course, be used alone or in any suitable combination.

As noted above, the reactant mixture used in producing the prepolymer, polymer, or resin in the coating can comprise an internal surfactant. As utilized herein, the term "internal surfactant" is used to refer to a compound comprising at least one surfactant group (e.g., an amine group, a carboxylic acid group, a sulfonic acid group, a sulfonate group, alkylene oxide groups, etc.) and at least one active hydrogen-containing group. In certain possibly preferred embodiments, the internal surfactant comprises two or more active hydrogen-containing groups in addition to the surfactant group. As will be understood by those of skill in the art, the internal surfactant preferably comprises at least two active hydrogen-containing groups so that the surfactant can be incorporated into the polymer chain of the polyurethane polymer or polymer segment through the reaction of both active hydrogen-containing groups with the isocyanate present in the reactant mixture. Suitable internal surfactants include, but are not limited to, sulfonate diamines, sulfonate diols, amine diols, dihydroxy carboxylic acids, polyethylene glycols, and combinations thereof. In certain possibly preferred embodiments, the internal surfactant is 2,2-bis(hydroxymethyl)propionic acid (which is also commonly known as dimethylolpropionic acid or DMPA), N-methyl diethanolamine (which is also commonly known as MDEA), or combinations thereof.

If present, the internal surfactant can comprise any suitable amount of the reactant mixture. When present, the internal surfactant typically is present within the reactant mixture in an amount sufficient to yield a polyurethane polymer or polymer segment having a sufficient number of hydrophilic groups (from the internal surfactant) to render the polymer dispersible in an aqueous medium. If the amount of internal surfactant is too high in relation to the other components, the resultant polymer can be expensive to produce and/or can comprise an excess of hydrophilic groups rendering the polymer soluble in an aqueous medium, rather than dispersible. In certain possibly preferred embodiments, the molar ratio of internal surfactant to isocyanate and colorant (i.e., the ratio of the number of moles of internal surfactant to the total number of moles of isocyanate and active hydrogen-terminated colorant) is about 0.05 or more, about 0.1 or more, about 0.15 or more, or about 0.2 or more. Typically, the molar ratio of internal surfactant to isocyanate and colorant is about 1 or less, about 0.80 or less, about 0.75 or less, about 0.6 or less, about 0.5 or less, about 0.45 or less, or about 0.4 or less. In certain possibly preferred embodiments, the molar ratio of internal surfactant to isocyanate and colorant is about 0.1 to about 0.5, about 0.15 to about 0.45, about 0.2 to about 0.45, or about 0.2 to about 0.40.

Other resins or polymers can be used in combinations with the aforementioned prepolymers, polymers, or resins. Thus, in certain embodiments, the coating can comprise one or more polymers or resins selected from the group consisting of polyvinyl chloride (PVC), polyvinylidene chloride, polyvinyl acetate, polyacrylic acid, alkylpolyacrylate, polymethacrylic acid, alkylpolymethacrylate, and copolymers thereof.

The colorant in the coating can be any suitable active-hydrogen terminated colorant, including polymeric colorants. As utilized herein, the term "active hydrogen-terminated colorant" is used to refer to a colorant comprising a chromophore and an active hydrogen-terminated constituent bound to the chromophore. The active hydrogen-terminated constituent can be bound to the chromophore via any suitable means, such as a covalent bond, an ionic bond, or suitable electrostatic interaction. The term "active hydrogen" is utilized herein to refer to a hydrogen atom that is bonded to an atom that is more electronegative than carbon. Suitable active hydrogen-containing groups include, but are not limited to, a hydroxyl group, amine groups, amide groups, and sulfhydryl groups (e.g., thiols). Suitable active hydrogen-terminated colorants comprise at least one active hydrogen-terminated group. Preferably, the active hydrogen-terminated colorant comprises at least two active hydrogen-terminated groups, which permits the colorant molecule to be incorporated into a polymer chain through the reaction of the active hydrogen-terminated groups with an isocyanate.

The term "polymeric colorant," as utilized herein, refers to a colorant comprising a chromophore and an oligomeric constituent bound to the chromophore. The oligomeric constituent can be bound to the chromophore via any suitable means, such as a covalent bond, an ionic bond, or suitable electrostatic interaction. The oligomeric constituent can have any suitable formula weight. As utilized herein in reference to the oligomeric constituent, the term "formula weight" refers to the weight (in grams) of the oligomeric constituent per mole of the polymeric colorant. In other words, the "formula weight" of the oligomeric constituent refers to the portion of the polymeric colorant's molecular weight attributable to the oligomeric constituent (the remainder being attributable to the chromophore and any groups attached thereto). Typically, the oligomeric constituent has a formula weight of about 40 or more. The oligomeric constituent typically has a formula weight of about 3,000 or less. In certain possibly preferred embodiments, the oligomeric constituent has a formula weight of about 40 to about 3,000.

Suitable active hydrogen-terminated colorants include, but are not limited to, those active hydrogen-terminated colorants conforming to structure (I) or structure (III) below

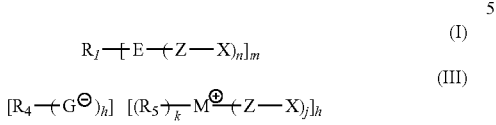

In structure (I), $R_1$ or $R_1$-$[E]_m$ represents an organic chromophore. E is a linking moiety selected from the group consisting of nitrogen, oxygen, sulfur, a sulfite group, a sulfonamide group, and a carboxyl group. Also, n and m are independently selected from the group consisting of integers between and including 1 and 5. In structure (III), $R_4$ or $R_4(G)_h$ represents an organic chromophore. G is selected from the group consisting of $SO_3^-$ (a sulfite anion) and $CO_2^-$ (a carboxylate anion). Each $R_5$ is independently selected from the group consisting of hydrogen, alkyl groups, and aryl groups, and M is selected from the group consisting of nitrogen atoms and phosphorous atoms. Also, h is an integer between and including 1 and 4, k is an integer between and including 0 and 5, and j is an integer between and including 1 and 6. The sum of k and j is equal to 4 when M is a nitrogen atom, and the sum of k and j is equal to 6 when M is a phosphorous atom.

In each of structures (I) and (III), X is an end group independently selected from the group consisting of hydrogen, a hydroxyl group, a sulfhydryl group, thiol groups, amine groups, alkyl groups, aryl groups, alkyl ester groups, aryl ester groups, organic sulfonate groups, organic sulfate groups, and amide groups. Also, each Z in the structures is a divalent organic moiety independently selected from the group consisting of $C_1$-$C_{20}$ alkyl moieties (e.g., $C_2$-$C_{10}$ alkyl moieties), aryl moieties, alkoxyl moieties, and oligomeric constituents. Suitable oligomeric constituents are independently selected from the group consisting of (i) oligomers comprising at least three monomers selected from the group consisting of $C_2$-$C_{20}$ alkyleneoxy groups, glycidol groups, and glycidyl groups, (ii) aliphatic oligomeric esters conforming to structure (II)

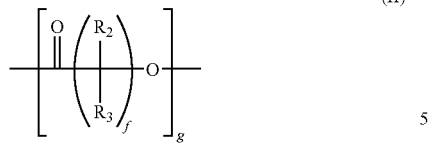

and (iii) combinations of (i) and (ii). In structure (II), $R_2$ and $R_3$ are independently selected from the group consisting of hydrogen and $C_1$-$C_{10}$ alkyl groups, f is an integer between and including 1 and 10, and g is any positive integer or fraction between and including 1 and 20. As will be understood by those of ordinary skill in the art, suitable values for g include both integers and fractions because the length of the oligomeric constituent on the individual colorant molecules may vary. Thus, the value for g represents an average length of the ester chain for a given sample or collection of colorant molecules.

An example of suitable active hydrogen-terminated colorants conforming to structure (I) include methine-based colorants, such as those colorants conforming to structure (IV)

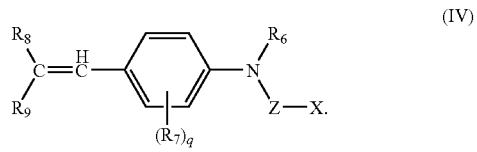

In structure (IV), $R_6$ is selected from the group consisting of hydrogen, alkyl groups, aryl groups, arylalkyl groups, alkylaryl groups, and constituents having the structure —Z—X, as defined above. Each $R_7$ is independently selected from the group consisting of hydrogen, halogen atoms, alkyl groups, alkoxy groups, nitrile groups, nitro groups, amide groups, and sulfonamide groups, and q is an integer between 0 and 4. $R_8$ and $R_9$ are independently selected from the group consisting of hydrogen, halogen atoms, tertiary amino groups, imine groups, cyano groups, pyridinium groups, ester groups, amide groups, sulfate groups, sulfonate groups, sulfide groups, sulfoxide groups, phosphine groups, phosphinium groups, phosphate groups, nitrile groups, mercapto groups, nitro groups, sulfone groups, acyl groups, azo groups, alkyl groups, alkoxy groups, aryl groups, aryloxy groups, arylalkyl groups, arylalkoxy groups, alkylaryl groups, and alkylaryloxy groups. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups.

More specific examples of methine-based active hydrogen-terminated colorants suitable for use in the invention include those active hydrogen-terminated colorants conforming to structure (IX)

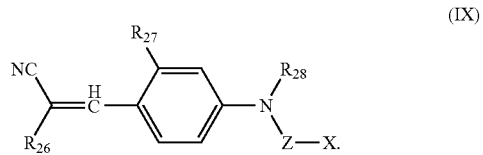

In structure (IX), $R_{26}$ is selected from the group consisting of cyano groups, nitro groups, alkylcarbonyl groups, arylalkylcarbonyl groups, alkoxycarbonyl groups, arylalkoxycarbonyl groups, amide groups, and alkylamide groups. $R_{27}$ is selected from the group consisting of hydrogen, $C_1$-$C_{20}$ alkyl groups, and $C_7$-$C_{20}$ arylalkyl groups. $R_{28}$ is selected from the group consisting of hydrogen, $C_1$-$C_{20}$ alkyl groups, aryl groups, $C_7$-$C_{20}$ arylalkyl groups, $C_7$-$C_{20}$ alkylaryl groups, and constituents having the structure —Z—X, as defined above. The —Z—X constituent (or at least one —Z—X constituents if more than one are present) terminates in a group selected from the group consisting of a hydroxyl group, thiol groups, primary amine groups, secondary amine groups, primary amide groups, and secondary amide groups. In certain possibly preferred embodiments of the methine-based colorants conforming to structure (IX), $R_{26}$ is a cyano group or a $C_1$-$C_{10}$ alkylcarbonyl group, $R_{27}$ is hydrogen or a methyl group, $R_{28}$ is an active hydrogen-terminated constituent having the structure —Z—X, and Z is a divalent organic moiety selected from the group consisting of $C_2$-$C_{10}$ alkyl moieties and oligomeric constituents comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments, the methine-based colorant conforms to structure (XVII) below

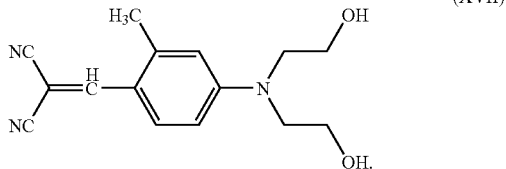

Another example of suitable active hydrogen-terminated colorants conforming to structure (I) include azo-based colorants, such as those colorants conforming to structure (V)

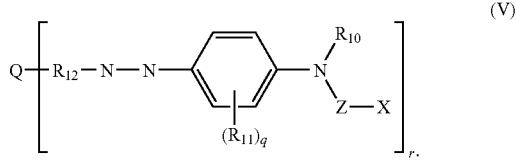

In structure (V), $R_{10}$ is selected from the group consisting of hydrogen, alkyl groups, aryl groups, arylalkyl groups, alkylaryl groups, and active hydrogen-terminated constituents having the structure —Z—X. Each $R_{11}$ is independently selected from the group consisting of hydrogen, halogen atoms, alkyl groups, alkoxy groups, nitrile groups, nitro groups, amide groups, and sulfonamide groups, and q is an integer between 0 and 4. $R_{12}$ is selected from the group consisting of aromatic groups and heteroatom-containing aromatic groups. Q is hydrogen or a linking group selected from the group consisting of oxygen, sulfur, a carbonyl group, a sulfonyl group, substituted and unsubstituted 1,3-benzothiazole groups, $C_1$-$C_8$ alkyl groups, $C_2$-$C_8$ alkene groups, a p-phenylenediamine group, a m-hydroxybenzene group, and a m-di($C_1$-$C_4$) alkoxybenzene group, and r is equal to 1 or 2. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups.

More specific examples of azo-based, active hydrogen-terminated colorants suitable for use in the leather articles include those active hydrogen-terminated colorants conforming to structure (X)

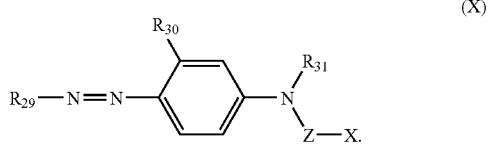

In structure (X), $R_{29}$ is selected from the group consisting of aromatic groups, heteroatom-containing aromatic groups, substituted and unsubstituted 1,3-benzothiazole groups, and substituted and unsubstituted 1,2-benzisothiazole groups (e.g., substituted and unsubstituted 1,2-benzisothiazole groups attached to the azo group through the 3-position of the benzisothiazole group). $R_{30}$ is selected from the group consisting of hydrogen, $C_1$-$C_{20}$ alkyl groups, and $C_7$-$C_{20}$ arylalkyl groups. $R_{31}$ is selected from the group consisting of hydrogen, $C_1$-$C_{20}$ alkyl groups, aryl groups, $C_7$-$C_{20}$ arylalkyl groups, $C_7$-$C_{20}$ alkylaryl groups, and active hydrogen-terminated constituents having the structure —Z—X. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups. In certain possibly preferred embodiments of the azo-based colorants conforming to structure (X), $R_{29}$ is an aromatic group or a heteroatom-containing aromatic group, $R_{30}$ is a hydrogen or a methyl group, $R_{31}$ is an active hydrogen-terminated constituent having the structure —Z—X, and Z is a divalent organic moiety selected from the group consisting of $C_2$-$C_{10}$ alkyl moieties and oligomeric constituents comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments, the azo-based, active hydrogen-terminated colorant conforms to structure (XVIII) below

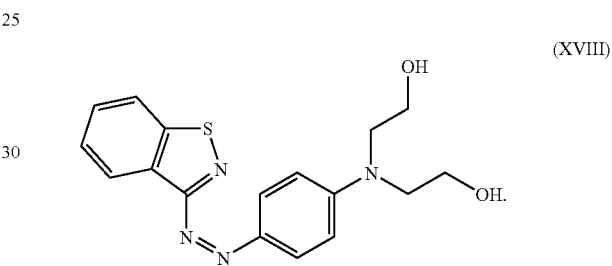

Azo-based colorants suitable for use in the leather articles include bisazo-based colorants such as those conforming to structure (XI)

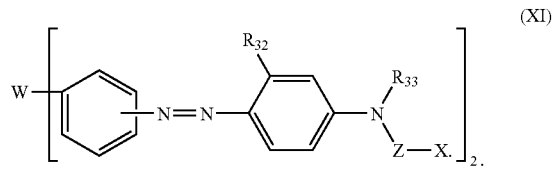

In structure (XI), W is a linking group and is selected from the group consisting of oxygen, sulfur, a sulfone group, a carbonyl group, $C_1$-$C_8$ alkyl groups, $C_2$-$C_8$ alkylene groups, and p-phenylenediamine. $R_{32}$ is selected from the group consisting of hydrogen, $C_1$-$C_{20}$ alkyl groups, and $C_7$-$C_{20}$ arylalkyl groups. $R_{33}$ is selected from the group consisting of hydrogen, $C_1$-$C_{20}$ alkyl groups, aryl groups, $C_7$-$C_{20}$ arylalkyl groups, $C_7$-$C_{20}$ alkylaryl groups, and active hydrogen-terminated constituents having the structure —Z—X. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups. In certain possibly preferred embodiments of the bisazo-based colorants conforming to structure (XI), W is a sulfone group, $R_{32}$ is hydrogen or a methyl group, $R_{33}$ is an active hydrogen-terminated constituent having the structure —Z—X, and Z is a divalent organic moiety selected from the group consisting of $C_2$-$C_{10}$ alkyl moieties and oligomeric constituents comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments, the bisazo-based, active hydrogen-terminated colorant conforms to structure (XIX)

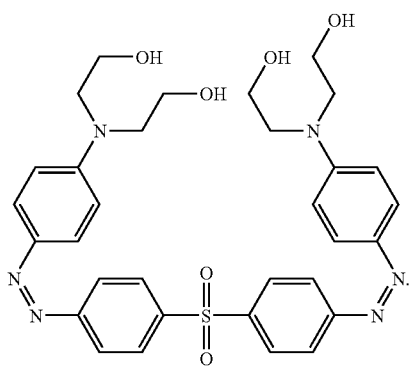

(XIX)

Suitable active hydrogen-terminated colorants conforming to structure (I) also include triphenylmethane-based colorants, such as those colorants conforming to structure (VI)

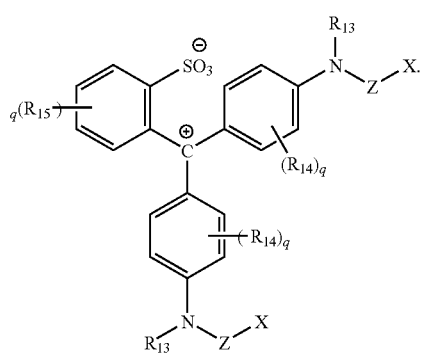

(VI)

$R_{13}$ is selected from the group consisting of hydrogen, alkyl groups, aryl groups, arylalkyl groups, alkylaryl groups, and active hydrogen-terminated constituents having the structure —Z—X, as defined above. $R_{14}$ is selected from the group consisting of hydrogen, halogen atoms, alkyl groups, alkoxy groups, alkylamino groups, and arylamino groups. $R_{15}$ is selected from the group consisting of hydrogen, halogen atoms, alkyl groups, alkoxy groups, alkylamino groups, arylamino groups, cyano groups, nitro groups, amide groups, sulfite groups, and sulfonamide groups, and each q is an integer between 0 and 4. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups.

More specific examples of triphenylmethane-based, active hydrogen-terminated colorants suitable for use in the invention include those active hydrogen-terminated colorants conforming to structure (XII)

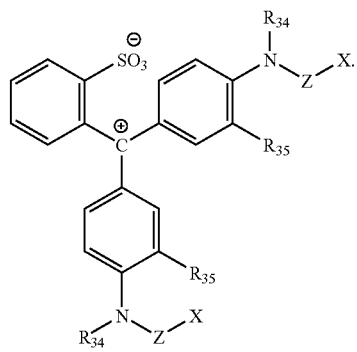

(XII)

In structure (XII), $R_{35}$ is selected from the group consisting of hydrogen, halogen atoms, alkyl groups, alkoxy groups, alkylamino groups, and arylamino groups. $R_{34}$ is selected from the group consisting of hydrogen, alkyl groups, aryl groups, arylalkyl groups, alkylaryl groups, and active hydrogen-terminated constituents having the structure —Z—X. Alternatively, $R_{35}$ can be joined to $R_{34}$ to form a ring. In certain possibly preferred embodiments of the triphenylmethane-based colorants conforming to structure (XII), $R_{35}$ is hydrogen, $R_{34}$ is an active hydrogen-terminated constituent having the structure —Z—X, and Z is a divalent organic moiety selected from the group consisting of $C_2$-$C_{10}$ alkyl moieties and oligomeric constituents comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments, the triphenylmethane-based, active hydrogen-terminated colorant conforms to structure (XX) below

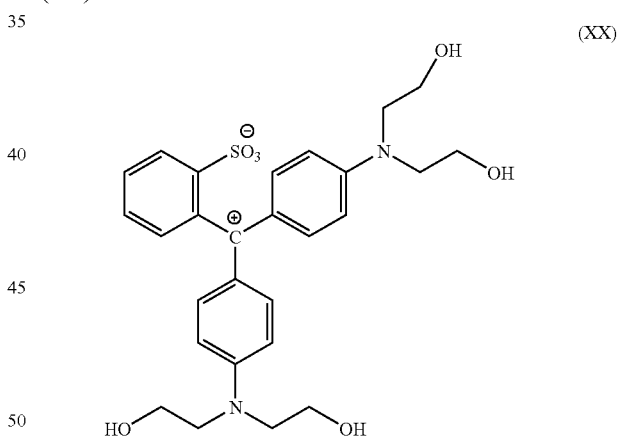

(XX)

Suitable active hydrogen-terminated colorants conforming to structure (I) further include benzodifuranone-based colorants, such as those colorants conforming to structure (VII)

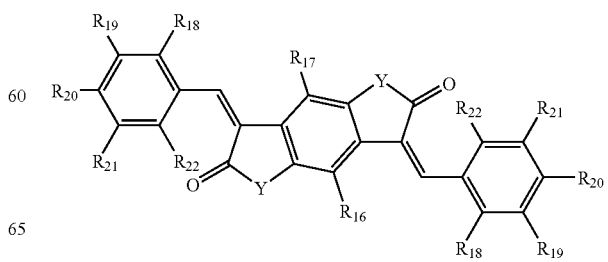

(VII)

In structure (VII), Y is selected from the group consisting of oxygen, sulfur, and groups having the structure —$NR_{40}$, where $R_{40}$ is selected from the group consisting of hydrogen, alkyl groups, and aryl groups. $R_{16}$ and $R_{17}$ are independently selected from the group consisting of hydrogen, halogen atoms, a hydroxyl group, alkyl groups, alkenyl groups, and alkoxy groups. $R_{18}$, $R_{19}$, $R_{20}$, $R_{21}$, and $R_{22}$ are independently selected from the group consisting of hydrogen, halogen atoms, $C_1$-$C_{20}$ alkyl groups, $C_1$-$C_{20}$ alkylester groups, a hydroxyl group, thio groups, cyano groups, sulfonyl groups, sulfo groups, sulfato groups, aryl groups, nitro groups, carboxyl groups, $C_1$-$C_{20}$ alkoxy groups, $C_1$-$C_{20}$ alkylamino groups, acrylamino groups, $C_1$-$C_{20}$ alkylthio groups, $C_1$-$C_{20}$ alkylsulfonyl groups, $C_1$-$C_{20}$ alkylphenyl groups, phosphonyl groups, $C_1$-$C_{20}$ alkylphosphonyl groups, $C_1$-$C_{20}$ alkoxycarbonyl groups, phenylthio groups, and active hydrogen-terminated constituents having the structure -E-(Z—X)$_n$, as defined above. At least one of $R_{18}$, $R_{19}$, $R_{20}$, $R_{21}$, and $R_{22}$ is an active hydrogen-terminated constituent having the structure -E-(Z—X)$_n$, and the —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups.

More specific examples of benzodifuranone-based active hydrogen-terminated colorants suitable for use in the invention include those active hydrogen-terminated colorants conforming to structure (XII)

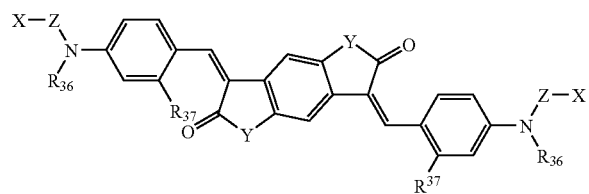
(XIII)

In structure (XIII), $R_{36}$ is selected from the group consisting of hydrogen, alkyl groups, aryl groups, arylalkyl groups, alkylaryl groups, and active hydrogen-terminated constituents having the structure —Z—X. $R_{37}$ is selected from the group consisting of hydrogen, halogen atoms, alkoxy groups, alkylamino groups, and a groups having the structure $R_{41}$—C(O)—NH—, where $R_{41}$ is selected from the group consisting of hydrogen, alkyl groups, and aryl groups. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups. In certain possibly preferred embodiments of the benzodifuranone-based colorants conforming to structure (XIII), $R_{37}$ is hydrogen or a methyl group, $R_{36}$ is an active hydrogen-terminated constituent having the structure —Z—X, and Z is a divalent organic moiety selected from the group consisting of $C_2$-$C_{10}$ alkyl moieties and oligomeric constituents comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments, the benzodifuranone-based, active hydrogen-terminated colorant conforms to structure (XXI) below

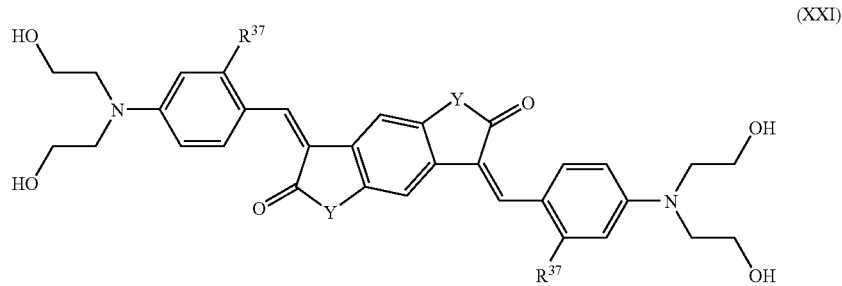
(XXI)

In structure (XXI), Y is selected from the group consisting of oxygen, sulfur, and groups having the structure —$NR_{40}$, where $R_{40}$ is selected from the group consisting of hydrogen, alkyl groups, and aryl groups. $R_{37}$ is hydrogen or a methyl group.

Another example of suitable active hydrogen-terminated colorants conforming to structure (I) include anthraquinone-based colorants, such as those colorants conforming to structure (VII)

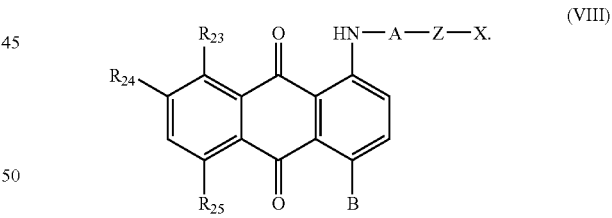
(VIII)

In structure (VIII), $R_{23}$ is selected from the group consisting of hydrogen, halogen atoms, a hydroxyl group, amine groups, nitro groups, and acetamide groups. $R_{24}$ and $R_{25}$ are independently selected from the group consisting of hydrogen and a hydroxyl group, and A is selected from the group consisting of alkyl groups and aryl groups. B is selected from the group consisting of groups conforming to structure (XV) and structure (XVI)

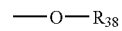
(XV)

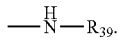
(XVI)

In structure (XV), $R_{38}$ is selected from the group consisting of hydrogen, $C_1$-$C_{18}$ alkyl groups, and aryl groups. In structure (XVI), $R_{39}$ is selected from the group consisting of aryl groups and active hydrogen-terminated constituents having the structure -A-Z—X. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups.

More specific examples of anthraquinone-based active hydrogen-terminated colorants suitable for use in the invention include those active hydrogen-terminated colorants conforming to structure (XIV)

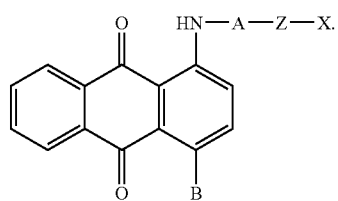
(XIV)

In structure (XIV), A is selected from the group consisting of alkyl groups and aryl groups, and B is selected from the group consisting of groups conforming to structure (XV) and structure (XVI)

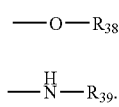
(XV)
(XVI)

In structure (XV), $R_{38}$ is selected from the group consisting of hydrogen, $C_1$-$C_{18}$ alkyl groups, and aryl groups. In structure (XVI), $R_{39}$ is selected from the group consisting of aryl groups and active hydrogen-terminated constituents having the structure -A-Z—X. In certain possibly preferred colorants conforming to structure (XIV), A is selected from the group consisting of alkyl groups and aryl groups, and B is a group having the structure —NH—$R_{39}$. The —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups.

Another example of suitable active hydrogen-terminated colorants conforming to structure (I) include anthraquinone-based colorants, such as those colorants conforming to structure (XXIII)

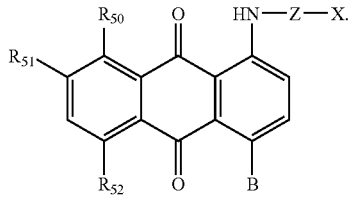
(XXIII)

In structure (XXIII), $R_{50}$ is selected from the group consisting of hydrogen, halogen atoms, a hydroxyl group, amine groups, nitro groups, and acetamide groups. $R_{51}$ and $R_{52}$ are independently selected from the group consisting of hydrogen and a hydroxyl group, and the —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups. B is selected from the group consisting of groups conforming to structure (XV) and structure (XXIV)

(XV)
(XVI)

In structure (XV), $R_{38}$ is selected from the group consisting of hydrogen, $C_1$-$C_{18}$ alkyl groups, and aryl groups. In structure (XVI), $R_{53}$ is selected from the group consisting of aryl groups and active hydrogen-terminated constituents having the structure —Z—X, as defined above.

More specific examples of anthraquinone-based, active hydrogen-terminated colorants suitable for use in the invention include those active hydrogen-terminated colorants conforming to structure (XXV)

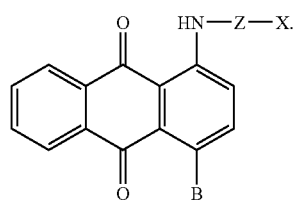
(XXV)

In structure (XIV), B is selected from the group consisting of groups conforming to structure (XV) and structure (XXIV)

(XV)
(XVI)

In structure (XV), $R_{38}$ is selected from the group consisting of hydrogen, $C_1$-$C_{18}$ alkyl groups, and aryl groups. In structure (XVI), $R_{53}$ is selected from the group consisting of aryl groups and active hydrogen-terminated constituents having the structure —Z—X. The —Z—X constituent in structure (XIV) (or at least one of the —Z—X constituents if more than one are present) terminates in a group selected from the group consisting of a hydroxyl group, thiol groups, primary amine groups, secondary amine groups, primary amide groups, and secondary amide groups. In certain possibly preferred colorants conforming to structure (XIV), B is a group having the structure —NH—$R_{53}$, and Z is a divalent organic moiety selected from the group consisting of $C_2$-$C_{10}$ alkyl moieties. In certain possibly preferred embodiments, the anthraquinone-based colorant conforms to structure (XXII) below

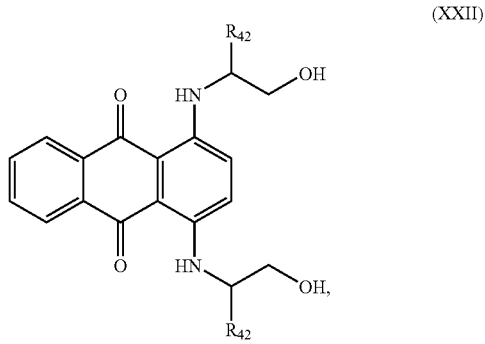

(XXII)

wherein $R_{42}$ is selected from the group consisting of hydrogen, methyl groups, and ethyl groups.

Suitable active hydrogen-terminated colorants conforming to structure (III) include phthalocyanine-based polymeric colorants in which $R_4$ is a metal phthalocyanine derivative. In certain possibly preferred embodiments of the polymeric colorants conforming to structure (III), $R_4$ is a copper phthalocyanine chromophore, G is a sulfite group, h, j, and k are equal to 2, $R_5$ is a $C_1$-$C_{20}$ alkyl group, M is a nitrogen, and the —Z—X constituent (or at least one of the —Z—X constituents if more than one are present) terminates in a group selected from the group consisting of a hydroxyl group, thiol groups, primary amine groups, secondary amine groups, primary amide groups, and secondary amide groups. In certain possibly preferred embodiments, Z is an oligomeric constituent as defined above, such as an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups.

The selection of a suitable active hydrogen-terminated colorant can be based on several factors. For example, when the active hydrogen-terminated colorant is used to produce a colored polyurethane prepolymer, polymer, or resin, the terminal active hydrogen on the colorant allows it to react with a suitable isocyanate-containing compound, thereby producing a colored prepolymer, polymer, or resin. This colored prepolymer, polymer, or resin can then be further reacted to produce a coated substrate (e.g., a colored leather article) according to the invention.

When directly used with a polyurethane resin solution or dispersion to produce a coated substrate (e.g., a colored leather article), the compatibility of the active hydrogen-terminated colorant (e.g., a polymeric colorant) with the resin is more important than the reactivity of active hydrogen terminal groups. In other words, the terminal group X is not believed to be critical with regard to the functioning of the active hydrogen-terminated colorant (e.g., a polymeric colorant) when the active hydrogen-terminated colorant (e.g., a polymeric colorant) is merely dispersed in the polymer or resin of the coating on the substrate.

The active hydrogen-terminated colorants can be present in the reactant mixture or coated substrate (e.g., leather articles) of the invention in any suitable amount (e.g., about 1 to about 75 wt. % based on the weight of the reactant mixture). Generally, the amount of the active hydrogen-terminated colorants employed in a colored polyurethane prepolymer or resin or coated substrate (e.g., leather article) depends upon the desired shade and depth of color. Other factors may include whether or not other coloring agents are employed, such as dyes and/or pigments. When used to produce polyurethane prepolymers or resins, the molar ratio of isocyanate/OH from the active hydrogen-terminated colorant(s) needs to be taken into account to adjust the loading of polyols (if used) since some active hydrogen-terminated colorants contain hydroxyl group(s). Another factor to consider is whether the active hydrogen-terminated colorants are used in the base layers or the skin coat layer. The amount of the active hydrogen-terminated colorant(s) employed is not limited to a specific weight range. However, to produce a colored polyurethane prepolymer or resin, the active hydrogen-terminated colorant(s) can be used in an amount of about 0.01 to 60% by weight, and may also be in the range of about 0.1 to about 15% by weight, with respect to the requirement of targeted color shade or depth or physical properties of the prepolymer or resin to be made. In certain possibly preferred embodiments, the amount of active hydrogen-terminated colorant(s) used to produce the prepolymer or resin can be an amount sufficient to provide a molar equivalent of active-hydrogen (from the colorant) that is equal to or less than that of isocyanate used to produce the prepolymer or resin in the coating.

In certain possibly preferred embodiments, the active hydrogen-terminated colorant comprises about 5 wt. % or more, about 10 wt. % or more, about 15 wt. % or more, about 20 wt. % or more, about 25 wt. % or more, about 30 wt. % or more, about 40 wt. % or more, or about 45 wt. % or more (e.g., about 50 wt. % or more) of the reactant mixture. As utilized herein, the "weight" of the reactant mixture refers to the total weight of the isocyanate, colorant, internal surfactant (if present), polyol (if present), and chain extender (if present) in the reactant mixture. Thus, the weight of the reactant mixture refers to the total weight of the reactants contained therein and does not include the weight of the solvent or other reaction medium in which the reactants are contained. Typically, the active hydrogen-terminated colorant comprises about 75 wt. % or less, about 70 wt. % or less, or about 65 wt. % or less of the reactant mixture. In certain possibly preferred embodiments, the active hydrogen-terminated colorant comprises about 5 to about 75 wt. % (e.g., about 5 to about 70 wt. % or about 5 to about 65 wt. %), about 10 to about 75 wt. %, about 15 to about 75 wt. %, or about 20 to about 75 wt. % of the reactant mixture. In certain other possibly preferred embodiments, the active-hydrogen terminated colorant comprises about 25 to about 75 wt. %, about 30 to about 75 wt. %, about 40 to about 70 wt. %, or about 45 to about 65 wt. % (e.g. about 50 to about 65 wt. % or about 50 to about 60 wt. %) of the reactant mixture.

In certain embodiments, the flexibility of the oligomer or polymer chain(s) of the active hydrogen-terminated colorant (e.g., a polymeric colorant) may be designed or modified to be compatible with almost any polymer resin and prepolymer, thus enabling a wide selection of isocyanates and polyols to be chosen to make polyurethane/polyurea resins or prepolymers, and/or other elastic polymers to be used with polyurethane/polyurea resins to achieve desired physical or chemical properties for the coated substrate (e.g., a colored leather article). Coated substrates (e.g., colored leather articles) containing active hydrogen-terminated colorants (e.g., a polymeric colorants) generally exhibit low to no bleeding and migration, for example, to release paper that may be used in making the coated substrates. While not wishing to be bound to any particular theory, this is believed to be due to either the compatibility between the colorants and the polymer(s) or resin(s) employed or the incorporation of the active hydrogen-terminated colorant into the polymer chain of the prepolymer, polymer, or resin (e.g., via the reaction of at least a portion of the active hydrogen-terminated constituents on the colorant with the isocyanate used in making the prepolymer, polymer, or resin). The liquid or paste nature of certain active hydrogen-terminated colorants (e.g., polymeric colorants) may also facilitate the coated substrate (e.g., colored synthetic leather) manufacturing process by eliminating the problems associated with handling large amounts of solids, such as the pigments typically used to produce coated substrates (e.g., synthetic leathers). The polymeric colorants' liquid or paste nature and compatibility with the resins may also shorten the amount of time needed to satisfactorily mix the colorants with the resins or prepolymers, as compared to the mixing times required when dyes or pigments are used.

In order to facilitate the incorporation of the colorants with an isocyanate and (if needed) chain extender and/or polyol to produce a colored prepolymer or resin, the active hydrogen-terminated colorants typically are provided in a liquid form. For those active hydrogen-terminated colorants that are solid at typical processing conditions, the colorant can be provided as a solution or dispersion of the colorant in a suitable solvent, such as dimethylformamide, toluene, and mixtures thereof (e.g., a mixture of toluene and isopropyl alcohol).

The inherent characteristics of the polymeric colorants, such as the liquid or paste nature and the compatibility of the polymeric colorants with each other, may enable one to freely blend several different polymeric colorants in several different amounts, without the need to use external solvents. The ability to freely blend the polymeric colorants can enable one to produce almost any desirable color shades, which are otherwise extremely difficult to achieve using conventional dyes or pigments. Thus, for example, by using only 5 polymeric colorants, such as a yellow colorant, an orange colorant, a red colorant, a violet colorant, and a blue colorant, one can achieve a much broader color space than that produced using conventional dyes and/or pigments. In one scenario, for example, a coated substrate (e.g., synthetic leather) manufacturer need only stock 5 different polymeric colorants to produce a wide variety of desired color shades for coated substrates (e.g., synthetic leather articles). Thus, the inherent characteristics of the polymeric colorants may enable the coated substrates (e.g., colored synthetic leather articles) according to the invention to achieve a much broader and/or brighter color shade than those previously obtained using conventional dyes and/or pigments.

Furthermore, the relatively high water solubility of the polymeric colorants may enable the manufacturing equipment used to produce coated substrates (e.g., a synthetic leather article) according to the invention to be cleaned more easily than equipment used to produce coated substrates (e.g., synthetic leather) using conventional dyes and/or pigments. This easy clean-up may enable the synthetic leather articles according to the invention to be produced in a more cost effective manufacturing process as compared to conventional manufacturing processes using conventional dyes and/or pigments.

In addition to the above-described active hydrogen-terminated colorants, other coloring agents can be incorporated into the coating on the coated substrates of the invention (e.g., synthetic leather article) in order to control the color hue. These coloring agents include conventionally known pigments and dyes. Examples of blue pigments include, but are not limited to, phthalocyanine C.I. Pigment Blue 15:3 and indanthrone C.I. Pigment Blue 60; examples of red pigments include, but are not limited to, quinacridone C.I. Pigment Red 122, azo C.I. Pigment Red 22, C.I. Pigment Red 48:1, C.I. Pigment Red 48:3 and C.I. Pigment Red 57:1; examples of yellow pigments include, but are not limited to, azo C.I. Pigment Yellow 12, C.I. Pigment Yellow 13, C.I. Pigment Yellow 14, C.I. Pigment Yellow 17, C.I. Pigment Yellow 97, C.I. Pigment Yellow 155, benzimidazolone C.I. Pigment Yellow 151, C.I. Pigment Yellow 154 and C.I. Pigment Yellow 180; examples of black pigments include, but are not limited to, carbon black. Examples of suitable dyes include, but are not limited to, solvent dyes, such as Yellow 82, Orange 5, Orange 62, Red 8, Red 62, Red 122, Blue 70, Black 27, and Black 34. For ease of handling and mixing in the production of the coated substrates (e.g., synthetic leather articles), any pigments used are preferably added in the form of a dispersion or in resin pallet/flake forms, and any dyes used are preferably added in the form of a solution or in resin pallet/flake forms.

The coated substrates (e.g., synthetic leather articles) of the invention can be produced using any suitable method. For example, the coated substrates (e.g., synthetic leather articles) can be produced using both "a direct coating process" and "a transfer coating process", or "dry" and "wet" methods. In two-component technologies, active hydrogen-terminated colorants can be mixed with chain extenders and/or polyols to react with isocyanates to form a high viscosity isocyanate- or hydroxyl-terminated prepolymer. This prepolymer can then be directly coated onto a substrate or onto a transfer substrate (e.g., release paper) using a doctor blade and cured by respective curing methods. If a free resin film is produced, the film then needs to be laminated to a substrate (e.g., textile substrate) in a subsequent step. In one-component technologies using commercially available polyurethane or polyurea resins, the active hydrogen-terminated colorant, such as a polymeric colorant, is mixed with the resin so that the colorant is dispersed or distributed within the resin rather than being incorporated into the resin's polymer chain. The resin can be used in the form of a solvent solution ("solvent method"), or the resin can be in the form of an aqueous dispersion ("aqueous method"). In the solvent method, the colorant(s) preferably are thoroughly mixed with a polyurethane solution in polar solvents, such as dimethylformamide (DMF) and/or methyl ethyl ketone (MEK). The high viscosity solution is then spread onto a carrier or release paper, and the material is oven dried and laminated onto a substrate to form a coated substrate (e.g., synthetic leather article). In the aqueous method, the colorant(s) preferably are thoroughly mixed with an aqueous polyurethane dispersion (PUD) to form an aqueous emulsion. A suitable substrate is then impregnated with the emulsion, and the coated substrate is dried and cured to produce a coated substrate (e.g., synthetic leather article).

In a first method embodiment, the invention provides a method for producing a coated substrate (e.g., synthetic leather article) comprising the steps of (a) providing a polymer, resin, or prepolymer, (b) providing an active hydrogen-terminated colorant (e.g., a polymeric colorant), (c) mixing the active hydrogen-terminated colorant (e.g., polymeric colorant) and the polymer, resin, or prepolymer to form a mixture, (d) applying the mixture obtained in step (c) onto a transfer substrate and heating the substrate to dry the substrate and form a resin coating thereon, (e) applying an adhesive onto the resin coating produced in step (d), (f) applying a backing substrate to the adhesive layer produced in step (e), (g) heating the assembly produced in step (f) to dry the assembly and bond the backing substrate to the adhesive layer, and (h) removing the transfer substrate from the assembly produced in (g) to produce a coated substrate (e.g., synthetic leather article).

The substrate, polymer, resin, prepolymer, and/or active hydrogen-terminated colorant (e.g., polymeric colorant) used in the first method embodiment can be any suitable substrate, polymer, resin, prepolymer, and/or active hydrogen-terminated colorant (e.g., polymeric colorant), including those described above with respect to the coated substrates (e.g., synthetic leather articles) according to the invention. The transfer substrate used in the first method embodiment can be any substrate that permits the formation of a resin coating thereon, while still enabling that resin coating to be released from the substrate without damaging the coating. Suitable transfer substrates include, but are not limited to, a release paper, such as a silicone-treated, mirror-surface release paper.

In accordance with the first method embodiment, a coated substrate (e.g., synthetic leather article) can be produced, for example, by thoroughly mixing a polyurethane resin solution in methyl ethyl ketone/dimethylformamide with at least one active hydrogen-terminated colorant (e.g., a polymeric colorant) and, optionally, with other additives. The mixture is then directly coated onto a release paper. After evaporating the solvent by oven drying or other drying process to produce a resin coating on the release paper, a thin layer of adhesive is applied onto the resin coating. A suitable substrate is then applied to the adhesive layer, and the resulting assembly is heated. The release paper is then peeled off of the assembly to reveal a coated substrate (e.g., a synthetic leather article). Furthermore, due to the lack of or minimal color migration resulting from the use of the polymeric colorants, the release paper typically is not discolored by the colorants employed and, therefore, can be reused.

In a second method embodiment, the invention provides a method for producing a coated substrate (e.g., synthetic leather article) comprising the steps of (a) providing a polymer, resin, or prepolymer, (b) providing an active hydrogen-terminated colorant (e.g., a polymeric colorant), (c) mixing the active hydrogen-terminated colorant (e.g., polymeric colorant) and the polymer, resin, or prepolymer to form a mixture, (d) applying the mixture obtained in step (c) onto a backing substrate, (e) immersing the coated substrate obtained in step (d) in an aqueous solution to cure the polymer, resin, or prepolymer and form a coating on the surface thereof, (f) removing the substrate from the aqueous solution, and (g) heating the substrate to dry the substrate and produce a coated substrate (e.g., a synthetic leather article).

The substrate, polymer, resin, prepolymer, and/or active hydrogen-terminated colorant (e.g., polymeric colorant) used in the second method embodiment can be any suitable substrate, polymer, resin, prepolymer, and/or active hydrogen-terminated colorant (e.g., polymeric colorant), including those described above with respect to the coated substrates (e.g., synthetic leather articles) according to the invention.

In accordance with the second method embodiment, a coated substrate (e.g., a synthetic leather article) can be produced, for example, by thoroughly mixing a polyurethane resin or prepolymer solution in dimethylformamide with at least one active hydrogen-terminated colorant (e.g., a polymeric colorant) and, optionally, with other additives. The mixture is then coated onto a suitable substrate, and the coated substrate is then immersed in an aqueous medium. While immersed in the aqueous medium, the solvent (e.g., dimethylformamide) is extracted from the mixture, which causes the polymer in the mixture to coagulate and form a film. The resulting substrate is then dried to produce a coated substrate (e.g., a synthetic leather article).

In another method embodiment, a method for producing a coated substrate (e.g., a leather article) comprises the steps of (a) providing a prepolymer or resin produced by the reaction of (i) an isocyanate, (ii) at least one reactant selected from the group consisting of chain extenders, polyols, and combinations thereof, and (iii) an active hydrogen-terminated colorant, (b) applying the prepolymer or resin onto a transfer substrate to form a film coating of the prepolymer, (c) applying a backing substrate onto the film coating of the prepolymer or resin produced in step (b), (d) heating the assembled backing substrate, film coating, and transfer substrate to bond the backing substrate to the film coating of the prepolymer or resin, and (e) removing the transfer substrate to yield a coated substrate (e.g., a leather article) comprising the backing substrate and a coating on a surface thereof. The coating comprises a prepolymer or resin produced by the reaction of (i) the isocyanate, (ii) the at least one reactant selected from the group consisting of chain extenders, polyols, and combinations thereof, and (iii) the active hydrogen-terminated colorant.

In another embodiment, a method for producing a coated substrate (e.g., a leather article) comprises the steps of (a) providing a prepolymer or resin produced by the reaction of (i) an isocyanate, (ii) at least one reactant selected from the group consisting of chain extenders, polyols, and combinations thereof, and (iii) an active hydrogen-terminated colorant, (b) providing a backing substrate, (c) applying the prepolymer or resin onto a surface of the backing substrate, (d) heating the coated backing substrate produced in step (c) to produce a coating on the surface of the backing substrate, thereby yielding a coated substrate (e.g., a leather article) comprising the backing substrate and a coating on a surface thereof. The coating comprises a prepolymer or resin produced by the reaction of (i) the isocyanate, (ii) the at least one reactant selected from the group consisting of chain extenders, polyols, and combinations thereof, and (iii) the active hydrogen-terminated colorant. In such an embodiment, the prepolymer or resin can be applied to the substrate using any suitable means, such as dip coating, spray coating, and the like.

The active hydrogen-terminated colorant, isocyanate, chain extender (if present), polyol (if present), and substrate utilized in the method embodiments can be any suitable active hydrogen-terminated colorant, isocyanate, chain extender, polyol, and substrate, including those described above with respect to the coated substrates (e.g., leather articles) according to the invention. The transfer substrate used in the methods can be any substrate that permits the formation of a resin coating thereon, while still enabling that resin coating to be released from the substrate without damaging the coating. Suitable transfer substrates include, but are not limited to, a release paper, such as a silicone-treated, mirror-surface release paper.

In accordance with the method embodiments, a coated substrate (e.g., a leather article) can be produced, for example, by thoroughly mixing an active hydrogen-terminated colorant, one or more suitable chain extenders (if desired), one or more suitable isocyanates, and a polyol (if desired) in a suitable medium, such as n-methylpyrrolidone, dimethylformamide, or a combination of methyl ethyl ketone and dimethylformamide. The mixture is then reacted to form an isocyanate-terminated or active hydrogen-terminated prepolymer or a resin, which resin or prepolymer has the active hydrogen-terminated colorant incorporated into the polymeric chain of the resin or prepolymer. As will be understood by those of ordinary skill in the art, the active hydrogen-terminated colorant is incorporated into the polymeric chain through the reaction of at least a portion of the active hydrogen-terminated constituents of the colorant with the isocyanate. For example, if the isocyanate is a polyisocyanate (e.g., a compound containing two or more isocyanate groups), then the isocyanate may react with multiple active hydrogen-terminated colorants, thereby linking the colorants molecules in a polymer chain. As this reaction between the isocyanate and active hydrogen-terminated colorants in the reactant mixture repeatedly occurs, a polymer or polymer segment comprising alternating monomer units derived from the colorant and isocyanate is produced. The isocyanate can also react with the chain extender(s) and/or polyol(s) (if present), which results in "linking" of the active hydrogen-terminated colorant and chain extender(s) and/or polyol(s) (if present) through a urethane group and the formation of the polymeric chain of a prepolymer or resin. The resulting prepolymer or resin typically is in the form of a viscous solution or dispersion, which can be further diluted with a suitable medium (e.g., dimethylformamide or a combination of methyl ethyl ketone and dimethylformamide) to facilitate application of the prepolymer or resin to the transfer substrate. Once applied to the transfer substrate, the solvent/medium is then removed by oven drying or other drying process to produce a prepolymer or resin coating on the transfer substrate. The prepolymer or resin produced by the above-described reaction can, in certain possibly preferred embodiments, be used in combination with other commercially-available resins to produce the coating on the surface of the substrate. Suitable resins include, but are not limited to, those commercially-available polyurethane resins, polyurea resins, acrylic resins, urethane-acrylic hybrid resins, and polyvinyl chloride resins currently used in the manufacture of coated substrates (e.g., leather articles or synthetic leather articles).

The coated substrates of the invention can also be made by applying to the target substrate, such as those substrates described above, a dispersion comprising a resin, prepolymer, or polymer suitable for forming a coating thereon, such as the resins, prepolymer, and polymers described above in the discussion of the coated substrates of the invention. In such a method, the dispersion can be applied to the substrate by any suitable means. For example, the dispersion can be applied to the substrate using an appropriate spraying apparatus (e.g., a rotary spray machine), a flow coating machine (e.g., a machine in which a thin, unbroken sheet of liquid is applied to a substrate passing through the sheet), a roll coating machine (e.g., a machine in which the liquid is picked up on a roll and transferred onto the substrate), or a seasoning machine (e.g., a machine in which the liquid is picked up from a supply by a rotating fluted roll, then transferred from the roll to the substrate by a rotary brush). Once the dispersion is applied to the substrate, the substrate can be dried by any suitable means, thereby producing a coating on the surface thereof.

The invention also provides dispersions of polymers suitable for use in making coated substrates. In a first embodiment, a dispersion comprises (a) an aqueous continuous phase, and (b) a discontinuous phase comprising a polyurethane polymer or polyurethane polymer segment. The polymer or polymer segment can be the product of the reaction of a reactant mixture comprising (i) a polyisocyanate, (ii) an internal surfactant, and (iii) an active hydrogen-terminated colorant. In a second embodiment, a dispersion comprises (a) an aqueous continuous phase and (b) a discontinuous phase comprising a polyurethane polymer or polyurethane polymer segment. The polymer or polymer segment can be produced by a process comprising the steps of (i) reacting a polyisocyanate with an active hydrogen-terminated colorant to produce a polymer intermediate and (ii) reacting the polymer intermediate produced in step (i) with an internal surfactant to produce the polyurethane polymer or polyurethane polymer segment.

The polyurethane polymer or polymer segment present in the discontinuous phase of the dispersion can be any suitable polymer or polymer segment, such as those incorporating an internal surfactant described above with respect to the coating on the coated substrates of the invention. The polymer or polymer segment can be produced using any suitable reactants in any suitable amounts, including those reactants and amounts described above with respect to the coating on the coated substrates of the invention.

In order to render the dispersion more stable, the polyurethane polymer or polymer segment described above can be further reacted with a suitable neutralizing agent, which neutralizes the surfactant groups present in the polymer. The neutralizing agent can be any suitable compound capable of reacting with at least a portion of the surfactant groups and protonating (for cationic surfactants) or deprotonating (for anionic surfactants) the same. Suitable neutralizing agents include, but are not limited to, acids and alkylamines, such as triethylamine, ethylenediamine, and combinations thereof.

The molecular weight of the polyurethane polymer or polymer segment in the discontinuous phase can also be increased by reaction of the polymer or polymer segment with a chain extender, such as those described above. In this process, any excess or unreacted isocyanate groups on the polyurethane polymer molecules react with the active hydrogen groups present on the chain extender thereby extending the chain length and, when the chain extender comprise two or more active hydrogen-containing groups, cross-linking some of the polyurethane polymer molecules.

The discontinuous phase of the dispersion can comprise any suitable amount of the dispersion. In certain possibly preferred embodiments, the discontinuous phase comprises about 5 wt. % or more, about 10 wt. % or more, about 15 wt. % or more, or about 20 wt. % or more (e.g., about 25 wt. % or more) of the dispersion, based on the total weight of the dispersion. Typically, the discontinuous phase comprises about 50 wt. % or less, about 40 wt. % or less, or about 35 wt. % or less (e.g., about 30 wt. % or less) of the dispersion, based on the total weight of the dispersion. In certain possibly preferred embodiments, the discontinuous phase comprise about 15 to about 50 wt. %, about 20 to about 40 wt. %, or about 25 to about 30 wt. % of the total weight of the dispersion.

The following examples further illustrate the invention but, of course, should not be construed as in any way limiting its scope.

EXAMPLE 1

This example demonstrates the production of a synthetic leather article in accordance with the invention. 70 parts (0.14 mol) of Fomrez® polyester polyol (available from Witco) having a molecular weight of 500 and an OH number of 225, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 136 parts (0.54 mol) of diphenylmethane-4,4'-diisocyanate was slowly added. After stirring for 15 minutes, 300 parts of DMF was added and the whole mixture was then heated to approximately 90-100° C. for 1.5 hours to complete the reaction. The resulting product was then diluted with DMF to form a red viscous polyurethane solution having a 25% solids content.

The red polyurethane solution was then applied to a commercially available fabric substrate to form a coating of the substrate having a thickness of 2 mm. The coated substrate was then soaked in an aqueous bath containing 4% by weight of DMF and kept at 30° C. for 5 minutes to coagulate the coating layer. The coated fabric was then soaked in warm water at approximately 50-60° C. for 40 minutes to extract the DMF, squeezed and dried at 100° C. for 20 minutes. A red synthetic leather was obtained.

EXAMPLE 2

This example demonstrates the production of a synthetic leather article in accordance with the invention. The procedure of Example 1 was repeated except that the red polymeric colorant was replaced with 60 parts of Millijet® Violet 82 polymeric colorant (available from Milliken Chemical) which had been diluted to a color value of 24 abs./g/L. The process produced a violet synthetic leather.

EXAMPLE 3

This example demonstrates the production of a synthetic leather article in accordance with the invention. The procedure of Example 1 was repeated except that the Fomrez® polyester polyol was replaced with 74 parts of Tone® Polyol 0201 polyester polyol (available from Dow), which had a molecular weight of 530 and an OH number of 210. The red polyurethane solution obtained had a solids content of 25%, and the process produced a red synthetic leather.

EXAMPLE 4

This example demonstrates the production of a synthetic leather article in accordance with the invention. The procedure of Example 3 was repeated except that the red polymeric colorant was replaced with 60 parts of Millijet® Violet 82 polymeric colorant (available from Milliken Chemical) which had been diluted to a color value of 24 abs./g/L. The process produced a violet synthetic leather.

EXAMPLE 5

This example demonstrates the production of a synthetic leather article in accordance with the invention. The procedure of Example 1 was repeated except that the Fomrez® polyester polyol was replaced with 116 parts of Tone® Polyol 0210 polyester polyol (available from Dow), which had a molecular weight of 830 and an OH number of 135. The red polyurethane solution obtained had a solids content of 25%, and the process produced a red synthetic leather.

EXAMPLE 6

This example demonstrates the production of synthetic leather articles in accordance with the invention. 70 parts (0.14 mol) of Fomrez® polyester polyol (available from Witco) having a molecular weight of 500 and an OH number of 225, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 152 parts (0.61 mol) of diphenylmethane-4,4'-diisocyanate was slowly added (the [NCO]/[OH] ratio being 1.12). After stirring for 15 minutes, 300 parts of DMF was added and the whole mixture was then heated to approximately 90-100° C. for 1.5 hours to complete the reaction. The resulting product was then diluted with DMF to form a red viscous polyurethane resin/prepolymer solution having a 25% solids content and a 12.2% (molarity) excess of free isocyanate.

In a first method for producing a synthetic leather article, the red polyurethane resin/prepolymer solution was directly applied onto a commercially available silicone-treated, mirror-surface release paper to form a film coating having a thickness of approximately 15 microns. A commercially available base substrate having a thickness of 1 mm (a non-woven fibrous sheet having a thickness of 80 microns and a polyurethane elastomer impregnated/coated and solidified on one side) was then pressed/bonded onto this film coating. Then, the assembly was heated to a temperature of approximately 120° C. in an oven and kept at that temperature for 3 minutes. The assembly was then removed from the oven and cooled down to room temperature, and the release paper was then peeled off of the assembly. A synthetic leather article having a red skin layer was thus obtained. Furthermore, no visible red color was detected on the release paper, which suggests that none of the red colorant had migrated onto the release paper.

In a second method for producing a synthetic leather article, the red polyurethane resin/prepolymer solution was applied to a commercially available fabric substrate to form a film coating having a thickness of 2 mm. The coated substrate was then soaked in an aqueous bath containing 4% by weight of DMF and kept at 30° C. for 5 minutes to coagulate the coating layer. The coated fabric was then soaked in warm water at 50-60° C. for 40 minutes to extract the DMF, squeezed and dried at 100° C. for 20 minutes. A red synthetic leather was obtained.

EXAMPLE 7

This example demonstrates the production of synthetic leather articles in accordance with the invention. The procedure of Example 6 was followed except that the Fomrez® polyester polyol was replaced with 74 parts of Tone® Polyol 0201 polyester polyol (available from Dow), which had a molecular weight of 530 and an OH number of 210. A red, viscous polyurethane resin/prepolymer solution having a 25% solids content and a 12.2% (molarity) excess of free isocyanate was obtained.

The resulting polyurethane resin/prepolymer solution was then used to produce red synthetic leather articles in accordance with the first and second methods described in Example 6. As in the first method described in Example 6, the release paper used to produce the synthetic leather article did not show visible signs of color migration.

EXAMPLE 8

This example demonstrates the production of synthetic leather articles in accordance with the invention. The procedure of Example 6 was followed except that the Fomrez® polyester polyol was replaced with 116 parts of Tone® Polyol 0210 polyester polyol (available from Dow), which had a molecular weight of 830 and an OH number of 135. The red, viscous polyurethane resin/prepolymer solution obtained had a solids content of 25% and a 12.2% (molarity) excess of free isocyanate.

The resulting polyurethane resin/prepolymer solution was then used to produce red synthetic leather articles in accordance with the first and second methods described in Example 6. As in the first method described in Example 6, the release paper used to produce the synthetic leather article did not show visible signs of color migration.

EXAMPLE 9

This example demonstrates the production of a synthetic leather article in accordance with the invention. 74 parts (0.14 mol) of Tone®0201 polyester polyol (available from DOW) having a molecular weight of 530 and an OH number of 210, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 152 parts (0.61 mol) of diphenylmethane-4,4'-diisocyanate was slowly added (the [NCO]/[OH] ratio being 1.12). After stirring for 15 minutes, 300 parts of DMF was added and the whole mixture was then heated to approximately 90-100° C. for 1.5 hours to complete the reaction. After the mixture had cooled to approximately 70° C., a solution containing 2.2 parts of methanol in 10 parts DMF was added to the mixture, and the resulting mixture was maintained at a temperature of approximately 70° C. for 20 minutes. The resulting product was then diluted with DMF to form a red, viscous polyurethane resin/prepolymer having a 25% solids content and a 6% (molarity) excess of free isocyanate.

The red polyurethane resin/prepolymer solution was then directly applied onto a commercially available silicone-treated, mirror-surface release paper to form a film coating having a thickness of approximately 0.15 mm. Onto this coating layer a commercially available base substrate having a thickness of 1 mm (a non-woven fibrous sheet having a thickness of 80 microns and a polyurethane elastomer impregnated/coated and solidified on one side) was pressed/bonded. Then, the assembly was heated to a temperature of approximately 120° C. in an oven and kept at that temperature for 3 minutes. The assembly was then removed from the oven and cooled to room temperature, and the release paper was then peeled off of the assembly. A synthetic leather having a red skin layer was thus obtained. Furthermore, no visible red color was detected on the release paper, which suggested that none of the red colorant had migrated onto the release paper.

EXAMPLE 10

This example demonstrates the production of a synthetic leather article in accordance with the invention. 116 parts (0.14 mol) of Tone® 0210 polyester polyol (available from DOW) having a molecular weight of 830 and an OH number of 135, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 152 parts (0.61 mol) of diphenyl-methane-4,4'-diisocyanate was slowly added (the [NCO]/[OH] ratio being 1.12). After stirring for 15 minutes, 300 parts of DMF was added and the whole mixture was then heated to approximately 90-100° C. for 1.5 hours to complete the reaction. After the mixture had cooled to approximately 70° C., a solution containing 4.2 parts (0.135 mol) of methanol in 10 parts DMF was added to the mixture, and the resulting mixture was maintained at a temperature of approximately 70° C. for 20 minutes. The resulting product was then diluted with DMF to form a red, viscous polyurethane resin having a 25% solids content and no excess of free isocyanate.

The red polyurethane resin/prepolymer solution was then directly applied onto a commercially available silicone-treated, mirror-surface release paper to form a film coating having a thickness of approximately 0.15 mm. Onto this coating layer a commercially available base substrate having a thickness of 1 mm (a non-woven fibrous sheet having a thickness of 80 microns and a polyurethane elastomer impregnated/coated and solidified on one side) was pressed/bonded. Then, the assembly was heated to a temperature of approximately 120° C. in an oven and kept at that temperature for 3 minutes. The assembly was then removed from the oven and cooled to room temperature, and the release paper was then peeled off of the assembly. A synthetic leather having a red skin layer was thus obtained. Furthermore, no visible red color was detected on the release paper, which suggested that none of the red colorant had migrated onto the release paper.

EXAMPLE 11

This example demonstrates the production of a synthetic leather article in accordance with the invention. 100 parts of UR-1100 polyurethane resin (available from Home Sun Industrial Co., Ltd of Taiwan) having a viscosity of 60,000-100,000 centipoises and a solids content of 29-31% in DMF/MEK/toluene, 10 parts of DMF, 90 parts of methyl ethyl ketone (MEK), and 0.3 parts of Millijet® Yellow 26 polymeric colorant (available from Milliken Chemical) which had been diluted to a color value of 27 abs/g/L are added to a beaker. The resulting mixture was vigorously stirred for 10 minutes using a mechanical stirrer to achieve a uniform, yellow, viscous polyurethane solution. A small amount of this yellow polyurethane solution was then directly poured onto a commercially available silicone-treated, mirror-effect release paper and spread out with a 0.12 mm-caved stainless steel drawing rod to form a film coating having a thickness of 0.12 mm. The coated release paper was then placed in an oven at a temperature of approximately 120° C. After approximately 1 minute, the coated release paper was then removed from the oven and cooled to room temperature. The coated release paper was then coated with a PVC forming resin solution using a 0.5 mm-caved drawing rod to form a 0.5 mm PVC film on the surface thereof. The resulting substrate was then placed in an oven at a temperature of approximately 200° C. for approximately 1 minute. After removing the coated release paper from the oven and cooling it to room temperature, an adhesive layer measuring approximately 0.12 mm in thickness was then coated onto the PVC film using a drawing rod. A commercially available base substrate (as described above) was then pressed into the freshly deposited adhesive layer. The resulting assembly was then placed in an oven at a temperature of approximately 120° C. for approximately 1-3 minutes. After the assembly had been removed from the oven and allowed to cool to room temperature, the release paper was removed. A synthetic leather article having a yellow polyurethane skin layer was thus obtained. Furthermore, no visible yellow color was detected on the release paper, which suggests that none of the yellow polymeric colorant had migrated onto the release paper.

COMPARATIVE EXAMPLE 1

A yellow, synthetic leather article was produced in accordance with the procedure described in Example 11, except that the yellow polymeric colorant was replaced with 0.3 parts of a yellow dye solution (30% color strength of C.I. Solvent Yellow 82 in xylene). Upon removal of the release paper, a significant amount of yellow color was observed on the release paper. This suggests that the yellow dye had migrated onto the release paper during the production of the synthetic leather article.

EXAMPLE 12

This example demonstrates the production of a synthetic leather article in accordance with the invention. An orange, synthetic leather article was produced in accordance with the procedure described in Example 11, except that the yellow polymer colorant was replaced with 0.6 parts of Millijet® Orange 31 polymeric colorant (available from Milliken Chemical), which had been diluted to a color value of 18 abs./g/L. As in example 11, no visible color was detected on the release paper after the synthetic leather article had been produced, which suggests that none of the orange polymeric colorant had migrated onto the release paper.

COMPARATIVE EXAMPLE 2

An orange, synthetic leather article was produced in accordance with the procedure described in Example 12, except that the orange polymeric colorant was replaced with 0.6 parts of an orange dye solution (30% color strength of C.I. Solvent Orange 54 in xylene/MEK). Upon removal of the release paper, a significant amount of orange color was observed on the release paper. This suggests that the orange dye had migrated onto the release paper during the production of the synthetic leather article.

EXAMPLE 13

This example demonstrates the production of a synthetic leather article in accordance with the invention. A red, synthetic leather article was produced in accordance with the procedure described in Example 11, except that the yellow polymer colorant was replaced with 0.6 parts of Millijet® Red 17 polymeric colorant (available from Milliken Chemical), which had been diluted to a color value of 30 abs./g/L. After removing the release paper, a slight reddish color was detected on the release paper, which suggests that only a trace amount of the red, polymeric colorant had migrated onto the release paper.

COMPARATIVE EXAMPLE 3

A red, synthetic leather article was produced in accordance with the procedure described in Example 13, except that the red polymeric colorant was replaced with 0.6 parts of a red dye solution (30% color strength of C.I. Solvent Red 8 in xylene/MEK). Upon removal of the release paper, a significant amount of red color was observed on the release paper. This suggests that the red dye had migrated onto the release paper during the production of the synthetic leather article.

EXAMPLE 14

This example demonstrates the production of a synthetic leather article in accordance with the invention. 100 parts of UR-1100 polyurethane resin (available from Home Sun Industrial Co., Ltd of Taiwan) having a viscosity of 60,000-100,000 centipoises and a solids content of 29-31% in DMF/MEK/toluene, 10 parts of DMF, 90 parts of methyl ethyl ketone (MEK), and 0.3 parts of Millijet® Violet 82 polymeric colorant (available from Milliken Chemical) which had been diluted to a color value of 24 abs./g/L are added to a beaker. The resulting mixture was vigorously stirred for 10 minutes using a mechanical stirrer to achieve a uniform, violet, viscous polyurethane solution. A small amount of this violet polyurethane solution was then directly poured onto a commercially available silicone-treated, mirror-effect release paper and spread out with a 0.12 mm-caved stainless steel drawing rod to form a film coating having a thickness of 0.12 mm. The coated release paper was then placed in an oven at a temperature of approximately 120° C. After approximately 1 minute, the coated release paper was then removed from the oven and cooled to room temperature. An adhesive layer measuring approximately 0.12 mm in thickness was then coated onto the PU film using the same drawing rod. A commercially available base substrate (as described above) was then pressed into the freshly deposited adhesive layer. The resulting assembly was then placed in an oven at a temperature of approximately 120° C. for approximately 1-3 minutes. After the assembly had been removed from the oven and allowed to cool to room temperature, the release paper was removed. A synthetic leather article having a violet polyurethane skin layer was thus obtained. Furthermore, no visible violet color was detected on the release paper, which suggests that none of the violet polymeric colorant had migrated onto the release paper.

EXAMPLE 15

This example demonstrates the production of a synthetic leather article in accordance with the invention. A violet, synthetic leather article was produced in accordance with the procedure described in Example 11, except that the yellow polymer colorant was replaced with 0.3 parts of Millijet® Violet 82 polymeric colorant (available from Milliken Chemical), which had been diluted to a color value of 24 abs./g/L. As in example 11, no visible color was detected on the release paper after the synthetic leather article had been produced, which suggests that none of the violet polymeric colorant had migrated onto the release paper.

EXAMPLE 16

This example demonstrates the production of a synthetic leather article in accordance with the invention. A blue, synthetic leather article was produced in accordance with the procedure described in Example 11, except that the yellow polymer colorant was replaced with 0.6 parts of Millijet® Blue 28 polymeric colorant (available from Milliken Chemical), which had been diluted to a color value of 25 abs./g/L. As in example 11, no visible color was detected on the release paper after the synthetic leather article had been produced, which suggests that none of the blue polymeric colorant had migrated onto the release paper.

COMPARATIVE EXAMPLE 4

A blue, synthetic leather article was produced in accordance with the procedure described in Example 16, except that the blue polymeric colorant was replaced with 0.6 parts of a blue dye solution (30% color strength of C.I. Solvent Blue 70 in xylene/MEK). Upon removal of the release paper, a visible blue color was observed on the release paper. This suggests that the blue dye had migrated onto the release paper during the production of the synthetic leather article.

EXAMPLE 17

This example demonstrates the production of a synthetic leather article in accordance with the invention. A black, synthetic leather article was produced in accordance with the procedure described in Example 11, except that the yellow polymer colorant was replaced with 0.3 parts of a black polymeric colorant. The black polymeric colorant used was obtained by mixing 44% of Millijet® Orange 31 polymeric colorant (available from Milliken Chemical) diluted to a color value of 18 abs./g/L, 28% of Millijet® Violet 82 polymeric colorant (available from Milliken Chemical) diluted to a color value of 24 abs./g/L, and 28% of Millijet® Blue 28 polymeric colorant (available from Milliken Chemical) diluted to a color value of 39 abs./g/L. As in example 11, no visible color was detected on the release paper after the synthetic leather article had been produced, which suggests that none of the polymeric colorants had migrated onto the release paper.

COMPARATIVE EXAMPLE 5

A black, synthetic leather article was produced in accordance with the procedure described in Example 16, except that the black polymeric colorant was replaced with 0.3 parts of a black dye solution (30% color strength of C.I. Solvent Black 27 in xylene/MEK). Upon removal of the release paper, a visible black color was observed on the release paper. This suggests that the black dye had migrated onto the release paper during the production of the synthetic leather article.

EXAMPLE 18

This example demonstrates the production of a polyurethane prepolymer using an active hydrogen-terminated colorant. 5.25 parts of Fomrez® polyester polyol (available from Witco) having a molecular weight of 500 and an OH number of 225, 1.49 parts of a yellow dye conforming to structure (XVII), 7.5 parts of 1,4-butyleneglycol, and 34 parts of dimethylformamide (DMF) were charged into a 3-neck flask equipped with a reflux condenser, a mechanical stirrer, and a thermo-controller. With vigorous stirring, 28.3 parts of diphenylmethane-4,4'-diisocyanate were slowly added at a temperature of about 55° C. After stirring for 30 minutes, 34 parts of DMF were again added, and the whole mixture was then heated to approximately 65-70° C. for approximately 2 hours to complete the reaction. The resulting product was then adjusted with DMF to yield a yellow viscous polyurethane solution having approximately 38% solids content by weight.

EXAMPLE 19

This example demonstrates the production of a polyurethane prepolymer using an active hydrogen-terminated colorant. 17.4 parts of Fomrez® polyester polyol (available from Witco) having a molecular weight of 500 and an OH number of 225 and 8.2 parts of a blue dye conforming to structure (XXII) (in which $R_{42}$ was hydrogen) were dissolved in 125 parts of dimethylformamide (DMF) in a 3-neck flask equipped with a reflux condenser, a mechanical stirrer, and a thermo-controller. With vigorous stirring, 35.2 parts of diphenylmethane-4,4'-diisocyanate were slowly added at the temperature of approximately 55° C. After stirring for an additional 30 minutes at approximately 55° C., 6.8 parts of 1,4-butyleneglycol were slowly added, and the whole mixture was then heated to approximately 65° C. for approximately 30 minutes, then to approximately 75° C. for approximately 2 hours to complete the reaction. The resulting product was a blue viscous polyurethane solution having 35% solids content by weight.

EXAMPLE 20

This example demonstrates the production of a colored synthetic leather in accordance with the invention. The yellow polyurethane prepolymer solution prepared in Example 18 was directly applied onto a commercially available silicone-treated mirror-surface release paper to form a film coating of the prepolymer having a thickness of approximately 0.15 mm. A commercially available "BASE substrate" having a thickness of approximately 1 mm (a non-woven fibrous sheet having a thickness of approximately 80 microns which has been impregnated/coated with a polyurethane elastomer) was then pressed/bonded onto this coating layer. The resulting assembly is then placed in an oven at approximately 120° C. for approximately 3 minutes. The assembly was removed from the oven, allowed to cool to room temperature, and the release paper was then peeled off of the assembly. The resulting yellow, synthetic leather article comprises the BASE substrate and a resin coating on the surface thereof, which contains an active hydrogen-terminated colorant conforming to structure (XVII). Furthermore, visual inspection of the release paper revealed no visible yellow color, which suggests that no appreciable amount of the yellow dye had migrated onto the release paper during the process.

EXAMPLE 21

This example demonstrates the production of a colored synthetic leather in accordance with the invention. 1 part of the yellow polyurethane prepolymer prepared in Example 18 was mixed with 9 parts of a polyurethane pre-skin resin (UR-1390ND from Home Sun Industrial Co., Taiwan) in DMF/toluene/methyl ethyl ketone (MEK). The polyurethane pre-skin resin had a solids content of approximately 17%. The uniformly mixed polyurethane solution was then directly applied onto a commercially available silicone-treated mirror-surface release paper to form a film coating having a thickness of approximately 0.10 mm, and the release paper was then placed in an oven maintained at approximately 120° C. for approximately 1 minute to cure the resin. The coated paper was then removed from the oven and allowed to cool to room temperature. A 0.15 mm-thick coating of a polyurethane resin solution (SU13-550 from Stahl USA Inc. having 27% solids content) was then directly applied to the coated release paper. The resulting coated paper was then placed in an oven maintained at approximately 120° C. for approximately 2 minutes. The paper was then removed from the oven and cooled to room temperature. A 0.05 mm-thick layer of an adhesive resin solution (SU41-952 from Stahl USA Inc.) was applied to the coated paper. A "BASE substrate" (as described above) was then pressed/bonded onto the coated paper. The resulting assembly was placed in an oven maintained at approximately 120° C. for approximately 3 minutes. The assembly was then removed from the oven, allowed to cool to room temperature, and the release paper was removed. The resulting yellow, synthetic leather article comprises the BASE substrate and a resin coating on the surface thereof, which contains an active hydrogen-terminated colorant conforming to structure (XVII). Furthermore, visual inspection of the release paper revealed no visible yellow color, which suggests that no appreciable amount of the yellow dye had migrated onto the release paper during the process.

EXAMPLE 22

This example demonstrates the production of a colored synthetic leather in accordance with the invention. The procedure of Example 20 was repeated using the blue polyurethane prepolymer prepared in Example 19 in place of the yellow polyurethane prepolymer. The resulting blue, synthetic leather article comprises the BASE substrate and a resin coating on the surface thereof, which contains an active hydrogen-terminated colorant conforming to structure (XXII). Furthermore, visual inspection of the release paper revealed no visible blue color, which suggests that no appreciable amount of the blue dye had migrated onto the release paper during the process.

EXAMPLE 23

This example demonstrates the production of a colored synthetic leather in accordance with the invention. The procedure of Example 21 was repeated using the blue polyurethane prepolymer prepared in Example 19 in place of the yellow polyurethane prepolymer. The resulting blue, synthetic leather article comprises the BASE substrate and a resin coating on the surface thereof, which contains an active hydrogen-terminated colorant conforming to structure (XXII). Furthermore, visual inspection of the release paper revealed no visible blue color, which suggests that no appreciable amount of the blue dye had migrated onto the release paper during the process.

EXAMPLE 24

This example demonstrates the production of a dispersion in accordance with the invention. A one-liter reactor kettle was fitted with a condenser and a mechanical stirrer. Approximately 25 grams of a yellow, active hydrogen-terminated colorant (Leathertint™ Yellow 836 colorant from Milliken Chemical), 9.6 grams of DMPA (i.e., 2,2-bis(hydroxymethyl) propionic acid), 50 grams of 1-methyl-2-pyrrolidinone, and 0.04 grams of dibutyl tin dilaurate catalyst (MAVS 1038 catalyst from Witco of New Jersey) were added to the reactor. While stirring, the mixture was warmed to approximately 60° C. and purged with nitrogen for approximately 15 minutes. Approximately 43.8 grams of hydrogenated MDI (i.e., bis(4-isocyanatocyclohexyl)methane) (Desmodur W from Bayer MaterialScience of Pittsburgh, Pa.) was then added to the reactor. As the reaction began, the material warmed rapidly to 86° C. The temperature was held at approximately 90° C. (+7° C.) for approximately 5 hours to create a prepolymer. The reaction was monitored with infrared spectroscopy until the isocyanate concentration stabilized. The temperature was lowered to approximately 70° C., and approximately 7.2 grams of triethylamine was added while steadily mixing for approximately 30 minutes. In a separate mixing vessel, approximately 5.7 grams of ethylenediamine (EDA) was added to approximately 188.5 grams of deionized water. The heat was removed from the reaction vessel, and the EDA and water mixture was immediately added to the reactor. The mixture was rapidly stirred for approximately 1.5 hours and allowed to cool. The remaining isocyanate reacted with the free amine from the EDA to extend the polymer chain of the prepolymer. The result was a fine dispersion containing a colored, polyurethane polymer or prepolymer obtained from the reaction of the colorant, isocyanate, and internal surfactant.

EXAMPLE 25

This example demonstrates the production of a dispersion in accordance with the invention. A one liter reactor kettle was fitted with a condenser and a mechanical stirrer. Approximately 25 grams of a red, active hydrogen-terminated colorant (Leathertint™ Red 864 colorant from Milliken Chemical), 3.9 grams of DMPA, 61.7 grams of acetone, and 0.15 grams of dibutyl tin dilaurate catalyst (MAVS 1038 catalyst from Witco of New Jersey) were added to the reactor. While stirring, the mixture was warmed until the acetone refluxed (approximately 60° C.). Approximately 22.7 grams of hydrogenated MDI (i.e., bis(4-isocyanatocyclohexyl)methane) (Desmodur W from Bayer MaterialScience of Pittsburgh, Pa.) was then added to the reactor. The mixture was refluxed for approximately 6 hours. The reaction was monitored with infrared spectroscopy and allowed to continue until the isocyanate concentration stabilized. Then, approximately 2.9 grams of triethylamine was added and the resulting mixture was steadily mixed for approximately 30 minutes. In a separate mixing vessel, approximately 2.6 grams of ethylenediamine (EDA) was added to approximately 188.5 grams of deionized water. The heat was removed from the reaction vessel, and the EDA and water mixture was immediately added to the reactor. The mixture was rapidly stirred for approximately 1 hour and allowed to cool and complete polymerization. The remaining isocyanate reacted with the free amine of the EDA to extend the polymer chain. The result was a fine dispersion containing a colored, polyurethane polymer or prepolymer obtained from the reaction of the colorant, isocyanate, and internal surfactant. The dispersion contained approximately 21.7% solids by weight.

EXAMPLE 26

This example demonstrates the production of a dispersion in accordance with the invention. A one liter reactor kettle was fitted with a condenser and a mechanical stirrer. Approximately 40 grams of a red, active hydrogen-terminated colorant (Leathertint™ Red 864 colorant from Milliken Chemical), 4.4 grams of DMPA, and 0.34 grams of dibutyl tin dilaurate catalyst (MAVS 1038 catalyst from Witco of New Jersey) were added to the reactor. While stirring, the mixture was warmed to 70° C. Then, approximately 24.1 grams of meta-tetramethylxylylene diisocyanate (TMXDI® (META) from Cytec Industries Inc. of New Jersey) was added to the reactor. The temperature was raised to approximately 105° C. and held at that temperature for approximately 24 hours. Approximately 3.3 grams of triethylamine was added to approximately 178.0 grams of deionized water in a separate vessel, and the water was chilled to below approximately 20° C. The hot prepolymer mixture obtained from the reaction of the colorant, internal surfactant, and isocyanate was then added to the chilled water with rapid mixing while keeping the temperature below approximately 40° C. After mixing for approximately 3 minutes, approximately 3.0 grams of ethylenediamine (EDA) was added to the vessel and the rapid mixing continued for approximately 1 hour. The remaining isocyanate reacted with the free amine of the EDA to extend the polymer chain. The result was a fine dispersion containing a colored, polyurethane polymer or prepolymer obtained from the reaction of the colorant, isocyanate, and internal surfactant.

EXAMPLE 27

This example demonstrates the production of a dispersion in accordance with the invention. A one liter reactor kettle was fitted with a condenser and a mechanical stirrer. Approximately 35 grams of a blue, active hydrogen-terminated colorant conforming to structure (XII) (in which $R_{35}$ is hydrogen, $R_{34}$ is an oligomeric constituent having the structure —Z—X, and each —Z—X is a hydroxyl-terminated oligomeric constituent containing one ethylene oxide monomer and four propylene oxide monomers), 7.2 grams of DMPA, 18.8 grams of 1-methyl-2-pyrrolidinone, and 0.03 grams of dibutyl tin dilaurate catalyst (MAVS 1038 catalyst from Witco of New Jersey) were added to the reactor. While stirring, the mixture was warmed to 50° C. and purged with nitrogen for 15 minutes. Then, approximately 27.8 grams of hydrogenated MDI (i.e., bis(4-isocyanatocyclohexyl)methane) (Desmodur W from Bayer MaterialScience of Pittsburgh, Pa.) was added to the reactor. As the reaction began, the material warmed rapidly to approximately 86° C. The temperature was maintained at approximately 90° C. (±7° C.). After approximately 1 hour, an additional 15 grams of 1-methyl-2-pyrrolidinone was added. The reaction continued for approximately 3 more hours. The reaction was monitored with infrared spectroscopy until the isocyanate concentration stabilized. The temperature of the reactant mixture was lowered to approximately 75° C., and approximately 3.7 grams of triethylamine was added while steadily mixing the mixture for approximately 30 minutes. The heat was then removed from the reaction vessel. Approximately 234.7 grams of deionized water was then added to the reactor while rapidly stirring the mixture for approximately 24 hours and allowing the solution to cool. The remaining isocyanate reacted with the free amine of the triethylamine to extend the polymer chain. The result was a fine dispersion containing a colored, polyurethane polymer or prepolymer obtained from the reaction of the colorant, isocyanate, and internal surfactant. The dispersion contained approximately 21.3% solids by weight.

EXAMPLE 28

This example demonstrates the production of a dispersion in accordance with the invention. A one liter reactor kettle was fitted with a condenser and a mechanical stirrer. Approximately 30 grams of a red, active hydrogen-terminated colorant (Leathertint™ Red 864 colorant from Milliken Chemical), 2.9 grams of N-methyl diethanolamine (MDEA), 52.5 grams of acetone, and 0.13 grams of dibutyl tin dilaurate catalyst (MAVS 1038 catalyst from Witco of New Jersey) were added to the reactor. While stirring, the mixture was warmed until the acetone refluxed (approximately 60° C.). Then, approximately 19.4 grams of hydrogenated MDI (i.e., bis(4-isocyanatocyclohexyl)methane) (Desmodur W from Bayer MaterialScience of Pittsburgh, Pa.) was added to the reactor. The temperature was maintained at reflux for approximately 5 hours. The reaction was monitored with infrared spectroscopy until the isocyanate concentration stabilized. Approximately 7.3 grams of 1,4-butanediol was added to the resulting mixture while steadily mixing for approximately 2 hours. In a separate mixing vessel, approximately 2.1 grams of concentrated hydrochloric acid was added to approximately 149.3 grams of deionized water. The heat was removed from the reaction vessel, and the hydrochloric acid and water solution was immediately added to the reactor. The resulting mixture was rapidly stirred for approximately 1 hour, and the mixture was allowed to cool and complete polymerization. The result was a fine dispersion containing a colored, polyurethane polymer or prepolymer obtained from the reaction of the colorant, isocyanate, and internal surfactant. The dispersion contained approximately 23.8% solids by weight.

EXAMPLE 29

This example demonstrates the production of a dispersion in accordance with the invention. A one liter reactor kettle was fitted with a condenser and a mechanical stirrer. Approximately 30 grams of a red, active hydrogen-terminated colorant (Leathertint™ Red 864 colorant from Milliken Chemical), 52.9 grams of acetone, and 0.13 grams of dibutyl tin dilaurate catalyst (MAVS 1038 catalyst from Witco of New Jersey) were added to the reactor. While stirring, the mixture was warmed until the acetone refluxed (approximately 60° C.). Then, approximately 19.4 grams of hydrogenated MDI (i.e., bis(4-isocyanatocyclohexyl)methane) (Desmodur W from Bayer MaterialScience of Pittsburgh, Pa.) was added to the reactor. The temperature of the reactant mixture was held at reflux for approximately 4 hours. Next, approximately 3.3 grams of DMPA was added and the reactant mixture was refluxed for an additional 4 hours. The reaction was monitored with infrared spectroscopy until the isocyanate concentration stabilized. Approximately 2.5 grams of triethylamine was then added to the reactant mixture while steadily mixing for approximately 30 minutes. In a separate mixing vessel, approximately 2.2 grams of ethylenediamine (EDA) was added to approximately 137.4 grams of deionized water. The heat was then removed from the reaction vessel, and the EDA and water solution was then added to the reactor. The resulting mixture was rapidly stirred for approximately 30 minutes, the mixture was allowed to cool and complete polymerization. The remaining isocyanate reacted with the free amine of the triethylamine to extend the polymer chain. The result was a fine dispersion containing a colored, polyurethane polymer or prepolymer obtained from the reaction of the colorant, isocyanate, and internal surfactant. The dispersion contained approximately 23.3% solids by weight.

EXAMPLE 30

This example demonstrates the production of dispersions in accordance with the invention. Ten polyurethane dispersion colorants (Samples 30A-30J) were made using the procedure of Example 25 for random polymers or the procedure of Example 29 for block polymers. The molar ratio of isocyanate to hydroxyl content (abbreviated as "NCO:OH" in Table 1) and the molar ratio of internal surfactant to both isocyanate and colorant (abbreviated as "IS:NCO+Color" in Table 1) were varied between samples as set forth in Table 1 below. In Table 1, the "Color Values" refer to the amount (in grams) of colorant per amount (in grams) of the dispersion. In each case, the result was a fine dispersion containing a colored, polyurethane polymer or prepolymer obtained from the reaction of the colorant, isocyanate, and internal surfactant.

TABLE 1

Compositional information for Samples 30A-30J.

| Sample | Type | NCO:OH | IS:NCO + Color | Color Value | Solids (wt. %) |
|---|---|---|---|---|---|
| 30A | Random | 1.1 | 0.15 | 0.72 | 23.4 |
| 30B | Random | 1.1 | 0.25 | 0.67 | 24.4 |
| 30C | Random | 1.1 | 0.5 | 0.48 | 20.5 |
| 30D | Random | 1.1 | 0.75 | 0.23 | 25.6 |
| 30E | Random | 1.5 | 0.25 | 0.55 | 23.3 |
| 30F | Random | 2.0 | 0.25 | 0.40 | 24.6 |
| 30G | Block | 1.1 | 0.25 | 0.67 | 23.9 |
| 30H | Block | 1.5 | 0.25 | 0.55 | 21.7 |
| 30I | Block | 2.0 | 0.25 | 0.40 | 24.3 |
| 30J | Block | 2.5 | 0.25 | 0.27 | 24.7 |

EXAMPLE 31

This example demonstrates the production of a coating in accordance with the invention. Ten coating compositions were made by mixing approximately 4.4 g of WF-41-302 waterborne polyurethane dispersion (available from Stahl, Inc. of Peabody, Mass.), approximately 4.4 g of WF-40-357 waterborne polyurethane dispersion (available from Stahl, Inc. of Peabody, Mass.), approximately 0.5 g of XR-2569 crosslinker (available from Stahl, Inc. of Peabody, Mass.), approximately 0.2 g of XR-2500 crosslinker (available from Stahl, Inc. of Peabody, Mass.), approximately 0.5 g of water, and approximately 1.0 g of one of the dispersion samples labeled Samples 30A-30J. An eleventh sample was produced using the same basic coating composition except that 1.0 g of a red, active hydrogen-terminated colorant (Leathertint™ Red 864 colorant from Milliken Chemical) was used in place of the dispersion. The coating compositions were thoroughly stirred, cast onto a non-adherent surface, and heated to a temperature of approximately 120° C. (250° F.) until the coating compositions had completely dried.

Cuttings of the resulting coatings, which are referred to as Samples 30A-30J based on the dispersion used and Sample 31 for the sample made with raw colorant, weighing approximately one gram were then immersed in approximately 10 grams of distilled water or diisononyl phthalate (DINP) for approximately 48 hours at a temperature of approximately 40° C. (104° F.). After immersion, the cuttings were removed from the solvent and the amount of colorant extracted into the solvent was measured using visible spectroscopy. The spectroscopic measurements were calibrated using Beer's Law. The color extraction (calculated as milligrams of colorant extracted per gram of colorant in the dispersion) was measured with respect to the amount of colorant originally in the polyurethane dispersion, correcting for colorant solids, coating solids, and color value. The results of the extraction experiments are set forth in Table 2 below.

TABLE 2

Color extraction from water and DINP for coatings produced using Samples 30A-30J and Sample 31.

| Sample | Color Extraction (mg extracted/g colorant) | |
|---|---|---|
| | Water | DINP |
| 30A | 0.00030 | 0.0472 |
| 30B | 0 | 0.0028 |
| 30C | 0 | 0.0008 |
| 30D | 0.00271 | 0.0063 |
| 30E | 0.00007 | 0.0045 |
| 30F | 0.00046 | 0.0051 |
| 30G | 0.00234 | 0.1959 |
| 30H | 0.00107 | 0.1313 |
| 30I | 0.00065 | 0.0310 |
| 30J | 0.00014 | 0.0117 |
| 31 | 0.11006 | 1.9462 |

As can be seen from a comparison of the data set forth in Table 2, the coatings produced using the colored dispersions of the invention exhibited substantially lower color extraction than the coating produced by simple mixing of the raw colorant in the coating composition. While not wishing to be bound to any particular theory, it is believed that the lower color extraction exhibited by these coatings is due, at least in part, to the fact that the colorant forms a part of the polymer chain of a polyurethane polymer or polymer segment present within the coating. This incorporation of the colorant into the polymeric chain (through the reaction described above) is believed to inhibit the extraction of the colorant from the coating.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dispersion comprising:
   (a) an aqueous continuous phase, and
   (b) a discontinuous phase comprising a polyurethane polymer or polyurethane polymer segment that is the product of the reaction of a reactant mixture comprising:
      (i) a polyisocyanate,
      (ii) an internal surfactant, and
      (iii) an active hydrogen-terminated colorant, the active hydrogen-terminated colorant being selected from the group consisting of colorants conforming to structure (I) and structure (III)

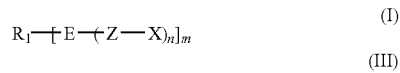

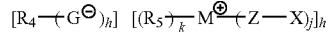

wherein $R_1$ or $R_1$-$[E]_m$ is an organic chromophore, E is a linking moiety selected from the group consisting of nitrogen, oxygen, sulfur, a sulfite group, a sulfonamide group, and a carboxyl group, and n and m are independently selected from the group consisting of integers between and including 1 and 5;

wherein $R_4$ or $R_4(G)_h$ is an organic chromophore, G is selected from the group consisting of $SO_3^-$ and $CO_2^-$, each $R_5$ is independently selected from the group consisting of hydrogen, alkyl groups, and aryl groups, M is selected from the group consisting of nitrogen atoms and phosphorous atoms, h is an integer between and including 1 and 4, k is an integer between and including 0 and 5, j is an integer between and including 1 and 6, and the sum of k and j is equal to 4 when M is a nitrogen atom and 6 when M is a phosphorous atom;

wherein each Z is a divalent organic moiety independently selected from the group consisting of $C_1$-$C_{20}$ alkyl moieties, aryl moieties, alkoxyl moieties, and oligomeric constituents, wherein the oligomeric constituents are selected from the group consisting of:

(A) oligomers comprising at least three monomers selected from the group consisting of $C_2$-$C_{20}$ alkyleneoxy groups, glycidol groups, and glycidyl groups, (B) aliphatic oligomeric esters conforming to structure (II)

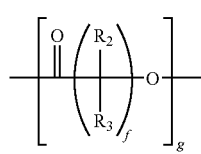

(II)

wherein $R_2$ and $R_3$ are independently selected from the group consisting of hydrogen and $C_1$-$C_{10}$ alkyl groups, f is an integer between and including 1 and 10, and g is any positive integer or fraction between and including 1 and 20, and (C) combinations of (A) and (B);

wherein each X is an end group independently selected from the group consisting of hydrogen, a hydroxyl group, a sulfhydryl group, thiol groups, amine groups, alkyl groups, aryl groups, alkyl ester groups, aryl ester groups, organic sulfonate groups, organic sulfate groups, and amide groups;

wherein at least one —Z—X constituent terminates in a group selected from the group consisting of a hydroxyl group, a sulfhydryl group, thiol groups, primary amine groups, secondary amine groups, primary amide groups, and secondary amide groups; and wherein the reactant mixture has a weight, and the active hydrogen-terminated colorant comprises greater than 20% of the weight of the reactant mixture.

2. The dispersion of claim 1, wherein the reactant mixture further comprises at least one reactant selected from the group consisting of chain extenders, polyols, and combinations thereof.

3. The dispersion of claim 1, wherein the active hydrogen-terminated colorant comprises about 25 to about 75% of the weight of the reactant mixture.

4. The dispersion of claim 1, wherein the discontinuous phase comprises the product of the reaction of the polyurethane polymer or polyurethane polymer segment and a neutralizing agent.

5. The dispersion of claim 1, wherein the discontinuous phase comprises the product of the reaction of the polyurethane polymer or polyurethane polymer segment, a neutralizing agent, and a chain extender.

6. The dispersion of claim 1, wherein the dispersion has a weight, and the discontinuous phase comprises about 5 to about 50% of the dispersion, based on the weight of the dispersion.

7. A dispersion comprising:

(a) an aqueous continuous phase, and (b) a discontinuous phase comprising a polyurethane polymer or polyurethane polymer segment produced by a process comprising the steps of:

(i) reacting a polyisocyanate with an active hydrogen-terminated colorant to produce a polymer intermediate, and (ii) reacting the polymer intermediate produced in step (i) with an internal surfactant to produce the polyurethane polymer or polyurethane polymer segment;

wherein the active hydrogen-terminated colorant is selected from the group consisting of colorants conforming to structure (I) and structure (III)

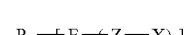

(I)

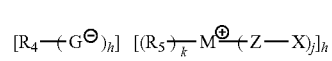

(III)

wherein $R_1$ or $R_1$—$[E]_m$ is an organic chromophore, E is a linking moiety selected from the group consisting of nitrogen, oxygen, sulfur, a sulfite group, a sulfonamide group, and a carboxyl group, and n and m are independently selected from the group consisting of integers between and including 1 and 5;

wherein $R_4$ or $R_4(G)_h$ is an organic chromophore, G is selected from the group consisting of $SO_3^-$ and $CO_2^-$, each $R_5$ is independently selected from the group consisting of hydrogen, alkyl groups, and aryl groups, M is selected from the group consisting of nitrogen atoms and phosphorous atoms, h is an integer between and including 1 and 4, k is an integer between and including 0 and 5, j is an integer between and including 1 and 6, and the sum of k and j is equal to 4 when M is a nitrogen atom and 6 when M is a phosphorous atom;

wherein each Z is a divalent organic moiety independently selected from the group consisting of $C_1$-$C_{20}$ alkyl moieties, aryl moieties, alkoxyl moieties, and oligomeric constituents, wherein the oligomeric constituents are selected from the group consisting of:

(A) oligomers comprising at least three monomers selected from the group consisting of $C_2$-$C_{20}$ alkyleneoxy groups, glycidol groups, and glycidyl groups, (B) aliphatic oligomeric esters conforming to structure (II)

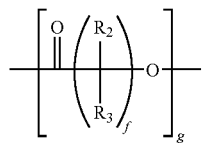 (II)

wherein $R_2$ and $R_3$ are independently selected from the group consisting of hydrogen and $C_1$-$C_{10}$ alkyl groups, f is an integer between and including 1 and 10, and g is any positive integer or fraction between and including 1 and 20, and (C) combinations of (A) and (B);

wherein each X is an end group independently selected from the group consisting of hydrogen, a hydroxyl group, a sulfhydryl group, thiol groups, amine groups, alkyl groups, aryl groups, alkyl ester groups, aryl ester groups, organic sulfonate groups, organic sulfate groups, and amide groups; and wherein at least one —Z—X constituent terminates in a group selected from the group consisting of a hydroxyl group, a sulfhydryl group, thiol groups, primary amine groups, secondary amine groups, primary amide groups, and secondary amide groups.

8. The dispersion of claim 7, wherein the discontinuous phase comprises the product of the reaction of the polyurethane polymer or polyurethane polymer segment and a neutralizing agent.

9. The dispersion of claim 7, wherein the discontinuous phase comprises the product of the reaction of the polyurethane polymer or polyurethane polymer segment, a neutralizing agent, and a chain extender.

10. The dispersion of claim 7, wherein the polyisocyanate, the active hydrogen-terminated colorant, and the internal surfactant have a combined total weight, and the active hydrogen-terminated colorant comprises about 25 to about 75% of said total weight.

11. The dispersion of claim 7, wherein the dispersion has a weight, and the discontinuous phase comprises about 5 to about 50% of the dispersion, based on the weight of the dispersion.

* * * * *